US008638285B2

(12) United States Patent
Nose et al.

(10) Patent No.: US 8,638,285 B2
(45) Date of Patent: Jan. 28, 2014

(54) IMAGE DATA TRANSFER TO CASCADE-CONNECTED DISPLAY PANEL DRIVERS

(75) Inventors: Takashi Nose, Kanagawa (JP); Hirobumi Furihata, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 641 days.

(21) Appl. No.: 12/801,244

(22) Filed: May 28, 2010

(65) Prior Publication Data
US 2010/0315406 A1    Dec. 16, 2010

(30) Foreign Application Priority Data

Jun. 11, 2009  (JP) ................................ 2009-140541

(51) Int. Cl.
*G09G 3/36*    (2006.01)
(52) U.S. Cl.
USPC ........................................... 345/100; 345/98
(58) Field of Classification Search
USPC ............................................. 345/100, 87, 98
See application file for complete search history.

(56) References Cited

U.S. PATENT DOCUMENTS

| 5,926,156 | A * | 7/1999 | Katoh et al. ..................... 345/55 |
| 5,990,857 | A * | 11/1999 | Kubota et al. ................... 345/98 |
| 6,437,768 | B1 * | 8/2002 | Kubota et al. .................. 345/100 |
| 6,836,266 | B2 * | 12/2004 | Kondo et al. ................... 345/103 |
| 7,193,597 | B2 * | 3/2007 | Sunohara ........................ 345/98 |
| 2001/0013850 | A1 * | 8/2001 | Sakaguchi et al. .............. 345/87 |

FOREIGN PATENT DOCUMENTS

| JP | 2001-174843 | 6/2001 |
| JP | 2002-366107 A | 12/2002 |
| JP | 2003-263139 A | 9/2003 |
| JP | 2006-350341 | 12/2006 |

OTHER PUBLICATIONS

Japanese Office Action dated Feb. 14, 2013 with partial English translation thereof.
Chinese Notification of First Office Action and Search Report dated Jun. 24, 2013.

* cited by examiner

*Primary Examiner* — Chanh Nguyen
*Assistant Examiner* — Roy Rabindranath
(74) *Attorney, Agent, or Firm* — McGinn Intellectual Property Law Group, PLLC

(57) ABSTRACT

A display device is provided with a display panel; first to n-th cascade-connected drivers (n being an integer of two or more); a controller transmitting compressed image data to the first driver. The i-th driver of the first to n-th drivers includes a drive circuitry driving the display panel; a first bus adapted to data transfer to the (i+1)-th driver of the first to n-th drivers; a second bus adapted to data transfer to the driver circuitry; and a decompression section receiving the compressed image data from the (i−1)-th driver of the first to n-th drivers or the controller. The decompression section of the i-th driver transfers the received compressed image data to the (i+1)-th driver through the first bus thereof, when the received compressed image data are not associated with the i-th driver. When the received compressed image data are associated with the i-th driver, the decompression section of the i-th driver decompresses the received compressed image data to generate decompressed image data and feeds the decompressed image data to the drive circuitry through the second bus. The drive circuitry drives the display panel in response to the decompressed image data.

13 Claims, 33 Drawing Sheets

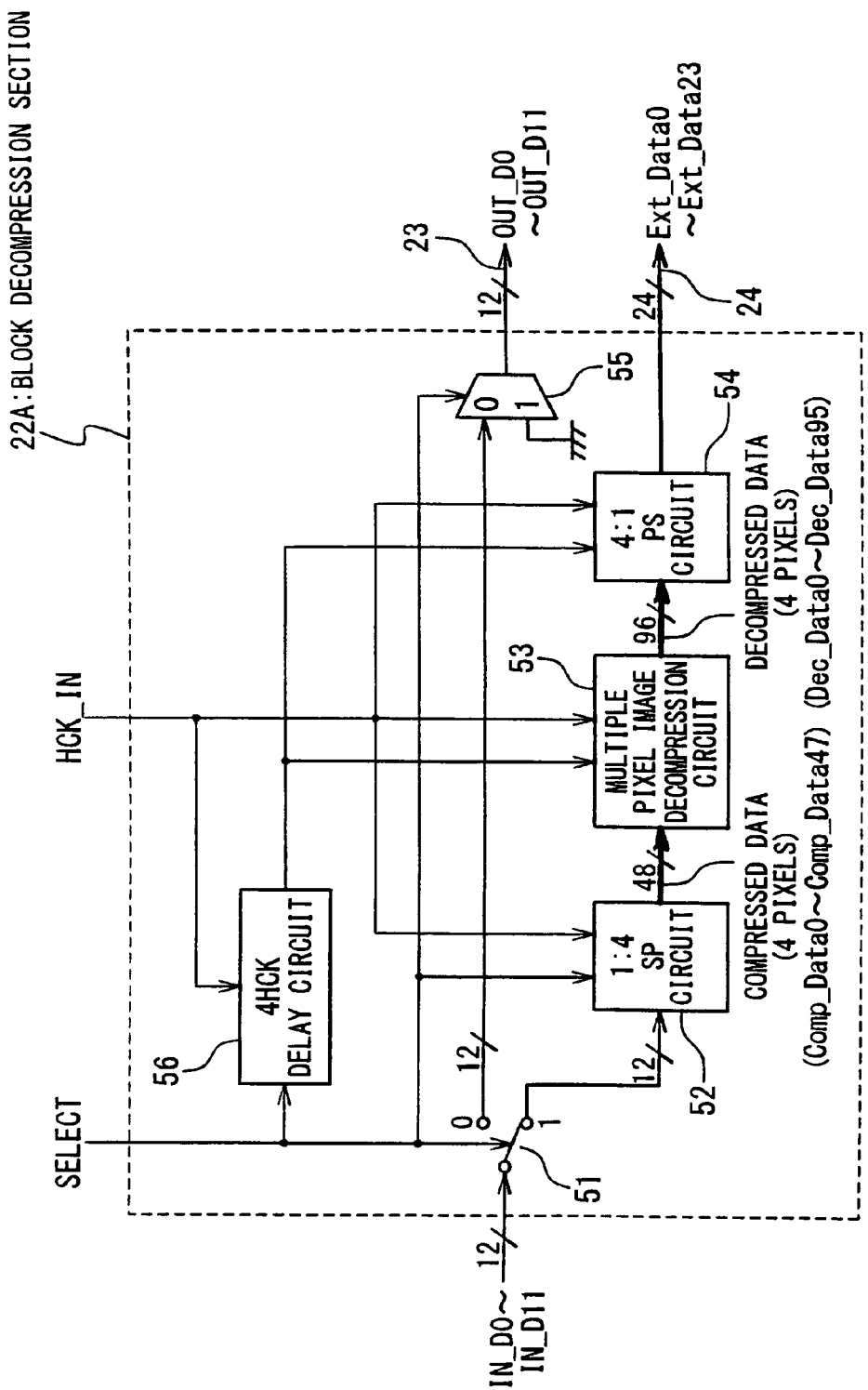

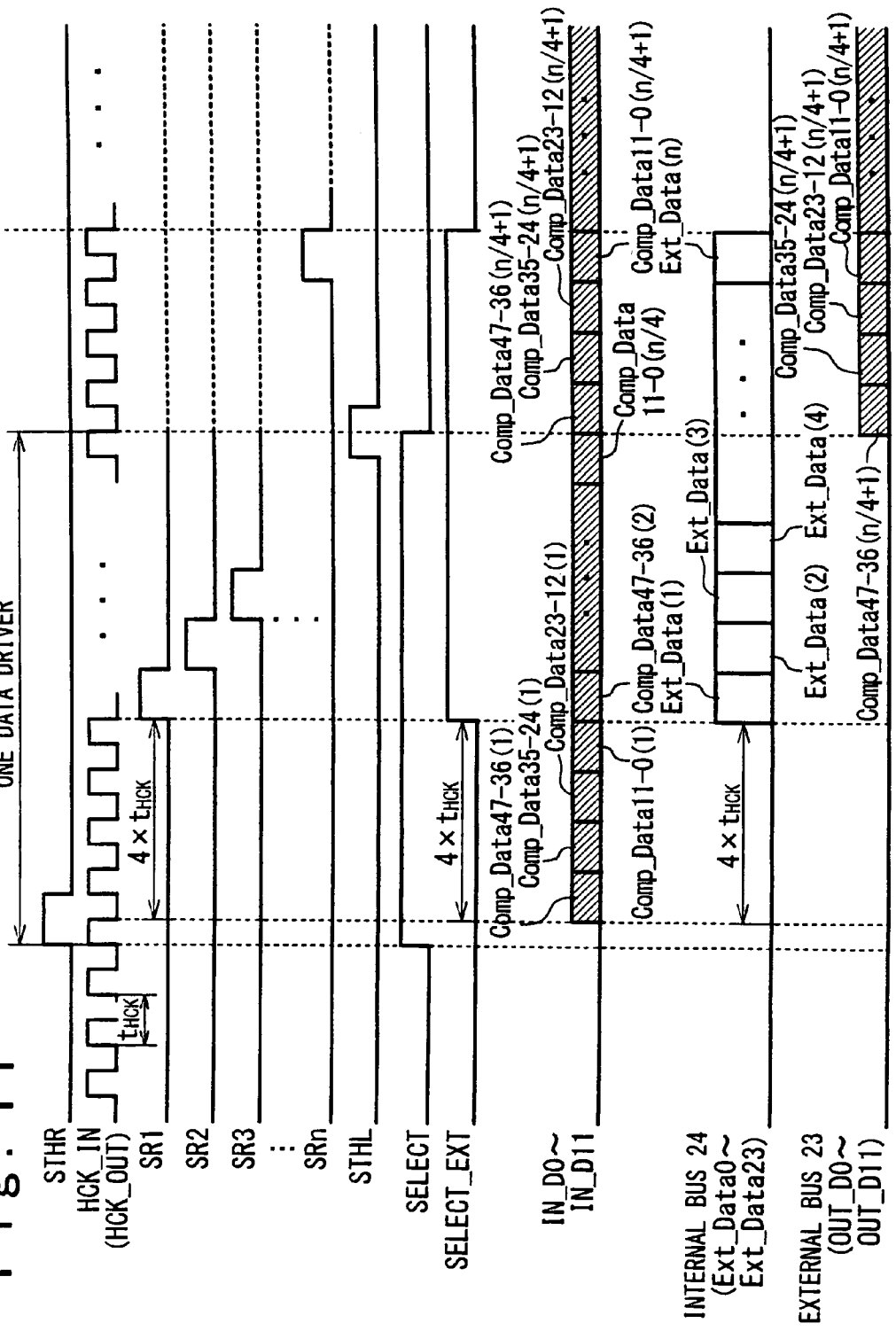

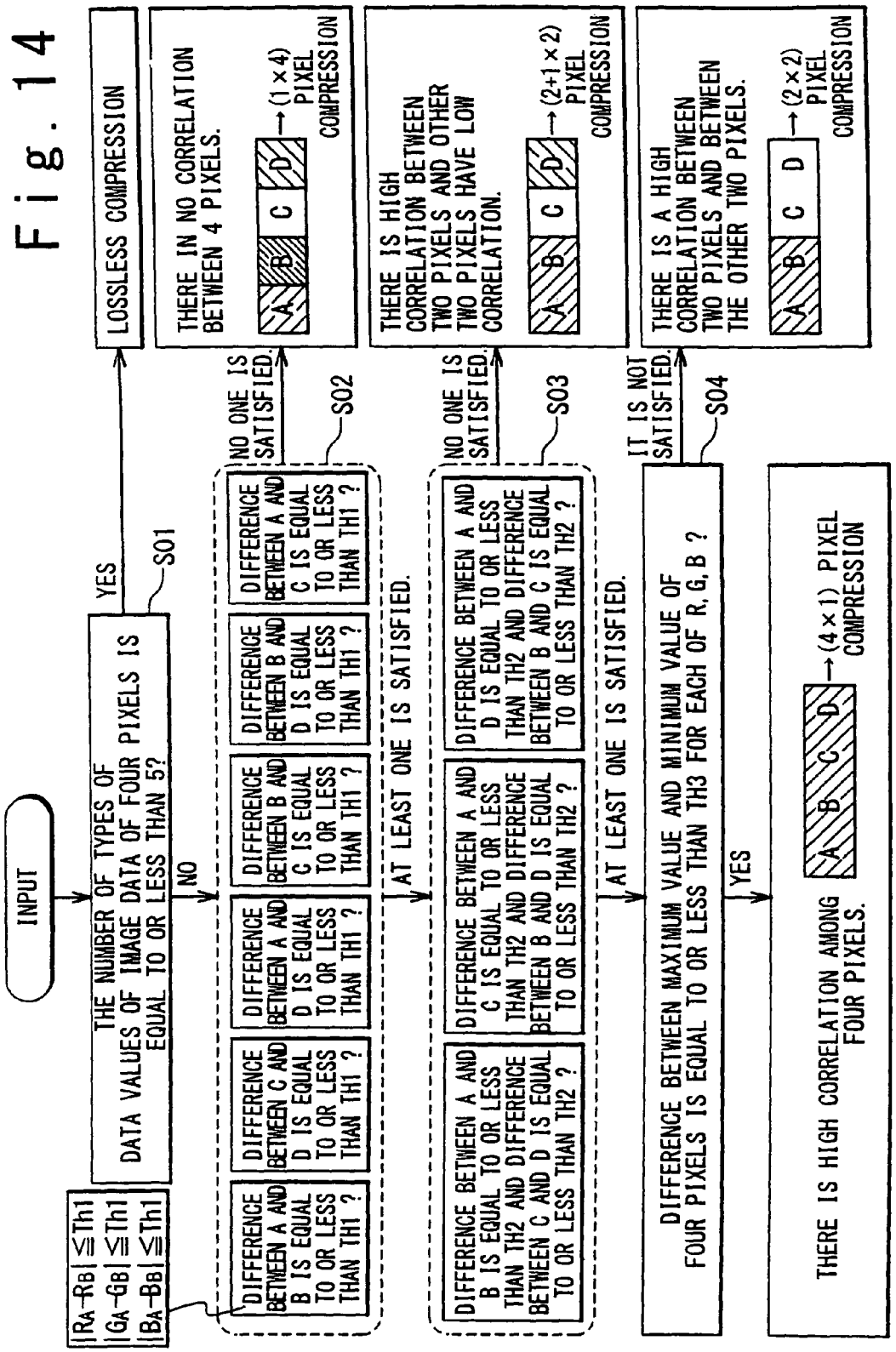

Fig. 15A

|   | R  | G | B  |
|---|----|---|----|
| A | 10 | 5 | 15 |
| B | 10 | 5 | 15 |
| C | 10 | 5 | 15 |
| D | 10 | 5 | 15 |

Fig. 15B

|   | R   | G   | B   |
|---|-----|-----|-----|
| A | 50  | 50  | 50  |
| B | 200 | 200 | 200 |
| C | 100 | 100 | 100 |
| D | 10  | 10  | 10  |

Fig. 15C

|   | R   | G | B |
|---|-----|---|---|
| A | 50  | 5 | 5 |
| B | 200 | 5 | 5 |
| C | 100 | 5 | 5 |
| D | 10  | 5 | 5 |

Fig. 15D

|   | R | G   | B |
|---|---|-----|---|
| A | 5 | 5   | 5 |
| B | 5 | 200 | 5 |
| C | 5 | 100 | 5 |
| D | 5 | 10  | 5 |

Fig. 15E

|   | R | G | B |
|---|---|---|---|
| A | 5 | 5 | 50 |
| B | 5 | 5 | 200 |
| C | 5 | 5 | 100 |
| D | 5 | 5 | 10 |

Fig. 15F

|   | R | G | B |
|---|---|---|---|
| A | 50 | 5 | 50 |
| B | 200 | 5 | 200 |
| C | 100 | 5 | 100 |
| D | 10 | 5 | 10 |

Fig. 15G

|   | R | G | B |
|---|---|---|---|
| A | 50 | 50 | 5 |
| B | 200 | 200 | 5 |
| C | 100 | 100 | 5 |
| D | 10 | 10 | 5 |

Fig. 15H

|   | R | G | B |
|---|---|---|---|
| A | 5 | 5 | 5 |
| B | 5 | 200 | 200 |
| C | 5 | 100 | 100 |
| D | 5 | 10 | 10 |

Fig. 16

| COMPRESSION TYPE RECOGNITION BITS (4 bits) | COLOR TYPE DATA (3 bits) | IMAGE DATA #1 (8 bits) | IMAGE DATA #2 (8 bits) | IMAGE DATA #3 (8 bits) | IMAGE DATA #4 (8 bits) | IMAGE DATA #5 (8 bits) | PUDDING (1 bit) |

Fig. 17A (1 X 4) PIXEL COMPRESSION

| | R | G | B | α |
|---|---|---|---|---|
| A | 50 | 1 | 30 | 0 |
| B | 51 | 100 | 39 | 5 |
| C | 4 | 4 | 100 | 10 |
| D | 100 | 1 | 2 | 15 |

ADD α →

| PIXEL | R | G | B |
|---|---|---|---|
| A | 50 | 1 | 30 |
| B | 56 | 105 | 44 |
| C | 14 | 14 | 110 |
| D | 115 | 16 | 17 |

ROUNDING / BIT TRUNCATION →

| | R | G | B |
|---|---|---|---|
| A | 3 | 0 | 2 |
| B | 4 | 7 | 3 |
| C | 1 | 1 | 7 |
| D | 7 | 1 | 1 |

ROUNDING /BIT TRUNCATION
FOR B SUBPIXEL OF PIXEL D:
TRUNCATE LOWER 5 BITS AFTER ADDING 16
FOR OTHERS: TRUNCATE LOWER 4 BITS AFTER ADDING 8

Fig. 17B

(1 × 4) PIXEL DECOMPRESSION

|   | R | G | B |
|---|---|---|---|
| A | 3 | 0 | 2 |
| B | 4 | 7 | 3 |
| C | 1 | 1 | 7 |
| D | 7 | 1 | 1 |

LEFT BIT SHIFT →

|   | R | G | B |
|---|---|---|---|
| A | 48 | 0 | 32 |
| B | 64 | 112 | 48 |
| C | 16 | 16 | 112 |
| D | 112 | 16 | 32 |

SUBTRACT α →

|   | R | G | B |
|---|---|---|---|
| A | 48 | 0 | 32 |
| B | 59 | 107 | 43 |
| C | 6 | 6 | 102 |
| D | 97 | 1 | 17 |

LEFT BIT SHIFT
FOR B SUBPIXEL OF PIXEL D: 5-BIT LEFT SHIFT
FOR OTHERS: 4-BIT LEFT SHIFT

Fig. 18

| COMPRESSION TYPE RECOGNITION BIT (1 bit) | R$_A$ DATA (4 bits) | G$_A$ DATA (4 bits) | B$_A$ DATA (4 bits) | R$_B$ DATA (4 bits) | G$_B$ DATA (4 bits) | B$_B$ DATA (4 bits) |
|---|---|---|---|---|---|---|

| R$_C$ DATA (4 bits) | G$_C$ DATA (4 bits) | B$_C$ DATA (4 bits) | R$_D$ DATA (4 bits) | G$_D$ DATA (4 bits) | B$_D$ (3 bits) |
|---|---|---|---|---|---|

Fig. 20A

DATA FOR TWO PIXELS WITH HIGH CORRELATION

| COMPRESSION TYPE RECOGNITION BITS (2 bits) | FORM RECOGNITION DATA (3 bits) | R REPRESENTATIVE VALUE (5 or 6 bits) | G REPRESENTATIVE VALUE (5 or 6 bits) | B REPRESENTATIVE VALUE (5 bits) | LARGE-SMALL RECOGNITION DATA (1 bit × 0~2) | β COMPARISON RESULT DATA (1 bit×2) |

DATA FOR TWO PIXELS WITH LOW CORRELATION

| Ri DATA (4 bits) | Gi DATA (4 bits) | Bi DATA (4 bits) | Rj DATA (4 bits) | Gj DATA (4 bits) | Bj DATA (4 bits) |

Fig. 20B

| COMPRESSION TYPE RECOGNITION BITS (2 bits) | FORM RECOGNITION DATA (2 bits) | R REPRESENTATIVE VALUE (5 or 6 bits) | G REPRESENTATIVE VALUE (6 or 7 bits) | B REPRESENTATIVE VALUE (5 bits) | LARGE-SMALL RECOGNITION DATA (1 bit × 0~2) | β COMPARISON RESULT DATA (1 bit×2) |
|---|---|---|---|---|---|---|

DATA FOR TWO PIXELS WITH HIGH CORRELATION

| Ri DATA (4 bits) | Gi DATA (4 bits) | Bi DATA (4 bits) | Rj DATA (4 bits) | Gj DATA (4 bits) | Bj DATA (4 bits) |
|---|---|---|---|---|---|

DATA FOR TWO PIXELS WITH LOW CORRELATION

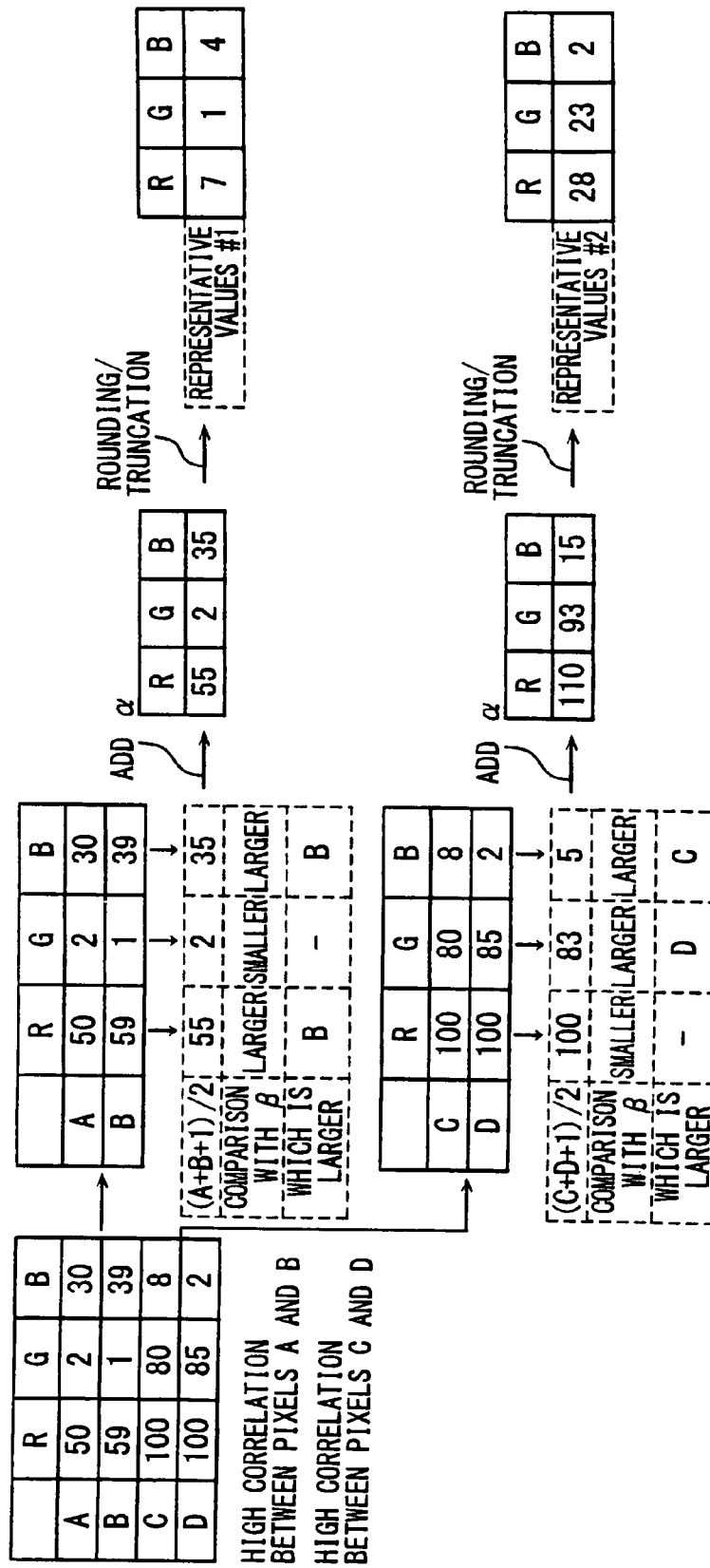

| COMPRESSION TYPE RECOGNITION BITS (3 bits) | FORM RECOGNITION DATA (2 bits) | DATA FOR TWO PIXELS | | | DATA FOR TWO PIXELS | | | LARGE-SMALL RECOGNITION DATA (1 bit × 0~6) | $\beta$ COMPARISON RESULT DATA (1 bit × 6) |
|---|---|---|---|---|---|---|---|---|---|
| | | R REPRESENTATIVE VALUE #1 (5 or 6 bits) | G REPRESENTATIVE VALUE #1 (5 or 6 bits) | B REPRESENTATIVE VALUE #1 (5 or 6 bits) | R REPRESENTATIVE VALUE #2 (5 or 6 bits) | G REPRESENTATIVE VALUE #2 (6 or 7 bits) | B REPRESENTATIVE VALUE #2 (5 or 6 bits) | | |

Fig. 22B

| COMPRESSION TYPE RECOGNITION BITS (3 bits) | FORM RECOGNITION DATA (1 bit) | DATA FOR TWO PIXELS | | | DATA FOR TWO PIXELS | | | LARGE-SMALL RECOGNITION DATA (1 bit × 0~6) | β COMPARISON RESULT DATA (1 bit × 6) |
|---|---|---|---|---|---|---|---|---|---|
| | | R REPRESENTATIVE VALUE #1 (5 or 6 bits) | G REPRESENTATIVE VALUE #1 (6 or 7 bits) | B REPRESENTATIVE VALUE #1 (5 or 6 bits) | R REPRESENTATIVE VALUE #2 (5 or 6 bits) | G REPRESENTATIVE VALUE #2 (6 or 7 bits) | B REPRESENTATIVE VALUE #2 (5 or 6 bits) | | |

Fig. 23B

|   | Y | Cb' | Cr' |
|---|---|---|---|
| A | 48 | 1 | -1 |
| B | 28 | 1 | -1 |
| C | 16 | 1 | -1 |
| D | 4 | 1 | -1 |

↑ MATRIX OPERATION

|   | R | G | B |
|---|---|---|---|
| A | 11 | 12 | 13 |
| B | 6 | 7 | 8 |
| C | 3 | 4 | 5 |
| D | 0 | 1 | 2 |

↑ RESTORE $Y_A$ TO $Y_D$ (4 X 1) PIXEL DECOMPRESSION

Fig. 24

| COMPRESSION TYPE RECOGNITION BITS (4 bits) | Ymin (10 bits) | Ydist0 (4 bits) | Ydist1 (4 bits) | Ydist2 (4 bits) | ADDRESS (2 bits) | Cb' (10 bits) | Cr' (10 bits) |

Fig. 25

|  |  | X1X0 | | | |
|---|---|----|----|----|----|
|  |  | 00 | 01 | 10 | 11 |
| Y1Y0 | 00 | 15 | 05 | 01 | 11 |
|  | 01 | 00 | 10 | 14 | 04 |
|  | 10 | 07 | 09 | 13 | 02 |
|  | 11 | 08 | 06 | 03 | 12 |

IMAGE DATA TRANSFER TO CASCADE-CONNECTED DISPLAY PANEL DRIVERS

INCORPORATION BY REFERENCE

This application claims the benefit of priority based on Japanese Patent Application No. 2009-140541, filed on Jun. 11, 2009, the disclosure of which is incorporated herein by reference.

BACKGROUND OF THE INVENTION

1. Field of the Invention

The present invention relates to a display device and a display panel driver, and more particularly to a display device in which multiple display panel drivers are cascade-connected.

2. Description of the Related Art

When a large-sized display panel (for example, a liquid crystal display panel and an electroluminescence display panel) is driven, multiple data drivers are generally used to drive the data lines (or the signal lines). In such configuration, the data drivers are often cascaded-connected. The cascade connection of the data drivers eliminates the necessity of using a TCP (tape carrier package) technique, and this is advantageous to reduce the cost. In this case, a supply of the image data to each data driver is performed by supplying the image data to the data driver located on the end and by transferring the image data to the adjacent data driver by each data driver.

FIG. 26 is a block diagram showing an example of the configuration of the display device in which data drivers are cascaded-connected. Shown in FIG. 26 is the configuration of a liquid crystal display device as an example. The liquid crystal display device as shown in FIG. 26 is, for example, disclosed in Japanese Patent Application Publication No. P2001-174843A. The liquid crystal display device 101 of FIG. 26 is configured to receive image data 103 and synchronization data 104 from an image drawing unit 102 (for example, a CPU), and to display an image in response to these data. In detail, the liquid crystal display device 101 includes a liquid crystal display panel 105, a timing controller 106, a gate driver 107, and data drivers 108. The gate driver 107 drives gate lines provided in the display area 105a of the liquid crystal display panel 105, and the data drivers 108 drive data lines provided in the display area 105a. The timing controller 106 supplies gate side control signals 109 to the gate driver 107, and also supplies data control signals 111 to the data drivers 108, thereby controlling the gate driver 107 and the data drivers 108.

In addition, the timing controller 106 supplies the image data 110 to each data driver 108. The image data 110 are transferred in the following manner to a desired data driver 108. The timing controller 106 transmits the image data 110 to the leftmost data driver 108 regardless of the actual destination of the image data 110 to be transferred. The leftmost data driver 108 transfers the transmitted image data 110 to the data driver 108 adjacent on the right. Similarly, upon receipt of the image data 110 from the data driver 108 adjacent on the left, each data driver 108 transfers the transmitted image data 110 to the data driver 108 adjacent on the right. Each data driver 108 fetches the transmitted image data 110 when the received image data 110 are data addressed to itself, and drives the data lines of the liquid crystal display panel 105 in response to the fetched image data 110.

The transfer of the image data 110 between the data drivers 108 is most typically performed through interconnections formed on a glass substrate of the liquid crystal display panel 105. Although it is possible to transfer the image data 110 between the data drivers 108 by lead wires, interconnections formed on a glass substrate are generally used for the data transfer in view of easy implementation.

In a display device in which data drivers are cascade-connected, there are generally two problems as follows: A first problem is that an increasing number of interconnections are required to be arranged on a glass substrate due to the increase of the number of display grayscale levels of the liquid crystal display device. The increase of the number of interconnections makes the actual implementation on the glass substrate difficult; this is one of the serious problems in view of the easiness of the implementation. Another problem is that there is a necessity for fast data transfer due to the enhancement of the definition of the liquid crystal display panel (that is, the increase of the number of pixels).

With respect to these problems, Japanese Patent Application Publication No. P2001-174843A discloses an approach adopting a fast serial interface; however, use of a fast serial interface on a glass substrate is technologically difficult, since interconnections on the glass substrate have high impedances.

On the other hand, Japanese Patent Application Publication No. P2006-350341A discloses a technique for reducing the necessary data transfer speed by distributedly transferring the image data from both of the right and left sides of the display panel by the timing controller. However, according to the technology disclosed in this literature, the data drivers directly receiving the image data from the timing controller and the other data drivers are different in configuration; data drivers of two different configurations are required in a single display apparatus. Further, the data drivers directly receiving the image data from the timing controller are mounted with a line memory to distribute the image data to the adjacent data drives. Hence, the technology disclosed in Japanese Patent Application Publication No. P2006-350341A suffers from a problem of increase in the cost.

As thus discussed, according to the study of the inventor, these conventional technologies are not effective approaches to the problems of the increase in the number of interconnections and the necessity of fast data transfer.

SUMMARY

In an aspect of the present invention, a display device is provided with a display panel; first to n-th cascade-connected drivers (n being an integer of two or more); a controller transmitting compressed image data to the first driver. The i-th driver of the first to n-th drivers includes a drive circuitry driving the display panel; a first bus adapted to data transfer to the (i+1)-th driver of the first to n-th drivers; a second bus adapted to data transfer to the driver circuitry; and a decompression section receiving the compressed image data from the (i−1)-th driver of the first to n-th drivers or the controller. The decompression section of the i-th driver transfers the received compressed image data to the (i+1)-th driver through the first bus thereof, when the received compressed image data are not associated with the i-th driver. When the received compressed image data are associated with the i-th driver, the decompression section of the i-th driver decompresses the received compressed image data to generate decompressed image data and feeds the decompressed image data to the drive circuitry through the second bus. The drive circuitry drives the display panel in response to the decompressed image data.

In another aspect of the present invention, a display panel driver is provided with a drive circuitry driving a display panel; a first bus adapted to data transfer to an external device; a second bus adapted to data transfer to the driver circuitry; and a decompression section externally receiving the compressed image data. The decompression section transfers the received compressed image data to the external device through the first bus, when the received compressed image data are not associated with the display panel driver. When the received compressed image data are associated with the display panel driver, the decompression section decompresses the received compressed image data to generate decompressed image data and feeds the decompressed image data to the drive circuitry through the second bus. The drive circuitry drives the display panel in response to the decompressed image data.

The present invention effectively allows reducing the number of interconnections connected between the display panel drivers and realizing fast data transfer in the display device provided with cascaded-connected display panel drivers.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 10 is a block diagram showing an exemplary configuration of a block decompression section in the third embodiment;

FIG. 11 is a timing chart showing an exemplary operation of the data driver in the third embodiment;

FIG. 14 is a flowchart showing an exemplary configuration procedure of the determination of correlation of image data in the third embodiment;

FIGS. 15A to 15H are diagrams showing examples of specific patterns for which lossless compressions are performed;

FIG. 16 is a diagram showing an exemplary format of lossless compressed data;

FIG. 17A is a conceptual illustration for explaining (1×4) pixel compression;

FIG. 17B is a conceptual illustration for explaining a decompression method of the compressed image data compressed by (1×4) pixel compression;

FIG. 18 is a diagram showing an exemplary format of the (1×4) compressed data;

FIG. 20A is a diagram showing an exemplary format of (2+1×2) compressed data;

FIG. 20B is a diagram showing another exemplary format of (2+1×2) compressed data;

FIG. 21A is a conceptual illustration for explaining (2×2) pixel compression;

FIG. 21B is a conceptual illustration for explaining the decompression method of the compressed image data compressed by the (2×2) pixel compression;

FIG. 22A is a diagram showing an exemplary format of the (2×2) compressed data;

FIG. 22B is diagram showing another exemplary format of the (2×2) compressed data;

FIG. 23B is a conceptual illustration for explaining the decompression method of the compressed image data compressed by the (4×1) pixel compression;

FIG. 24 is a diagram showing an exemplary format of the (4×1) compressed data;

FIG. 25 is a diagram showing an example of a basic matrix used for the generation of error data α.

DESCRIPTION OF PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

First Embodiment

Figure 1:
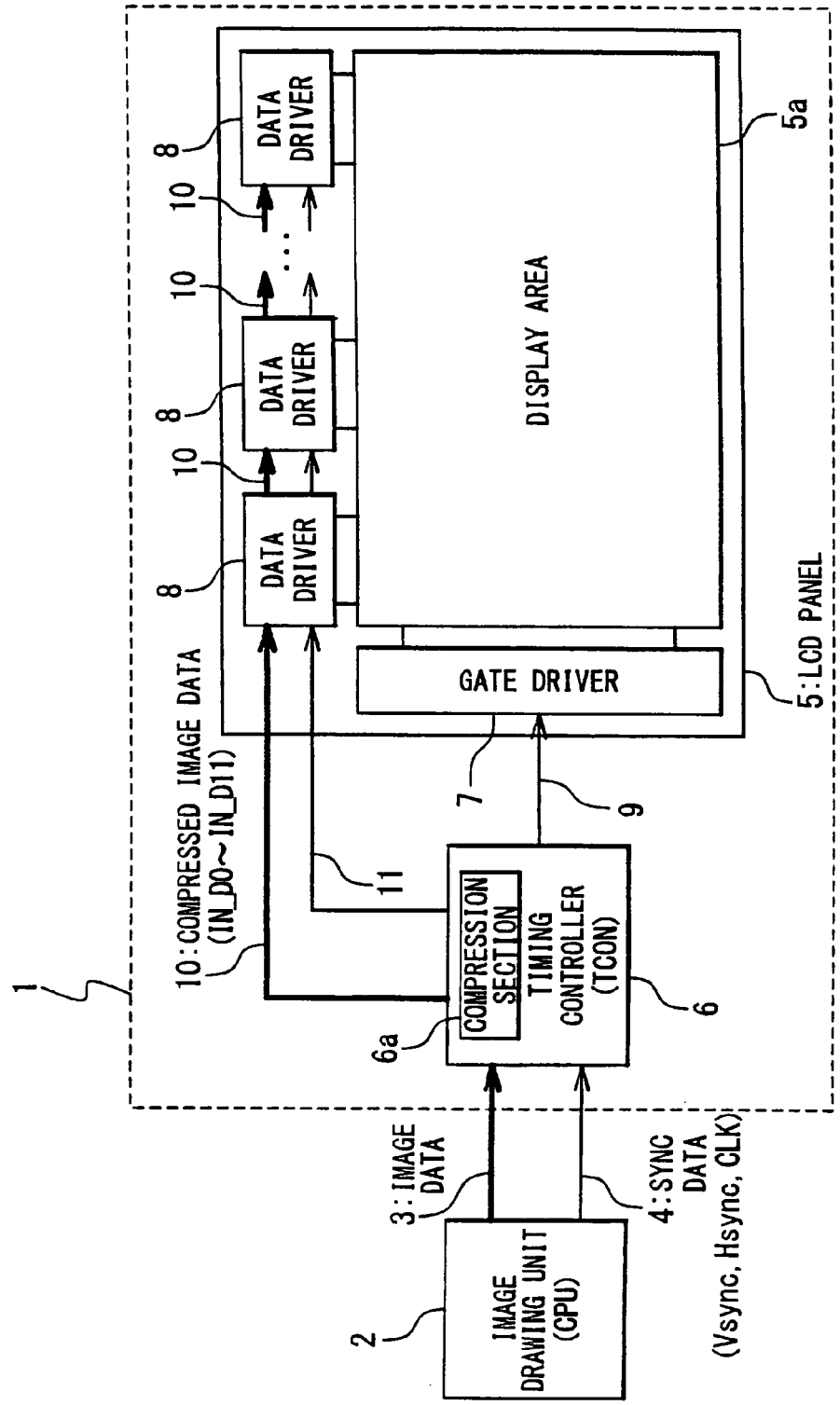
FIG. 1 is a block diagram showing the configuration of a liquid crystal display device in a first embodiment of the present invention.

FIG. 1 is a block diagram showing an exemplary configuration of a liquid crystal display device in a first embodiment of the present invention. A liquid crystal display device 1 of this embodiment is configured to receive image data 3 and synchronization data 4 from an image drawing unit 2 and display an image in response to the image data 3 and the synchronization data 4. The synchronization data 4 includes vertical sync data Vsync used for generating a vertical sync signal, horizontal sync data Hsync used for generating a horizontal sync signal, and clock data CLK used for generating a clock signal in the liquid crystal display device 1.

The liquid crystal display device 1 includes a liquid display panel 5, a timing controller 6, a gate driver 7, and data drivers 8. The liquid crystal display panel 5 has a display area 5a in which data lines (signal lines) and gate lines (scanning lines) are disposed. In the display area 5a, liquid crystal pixels are disposed at intersections of the data lines and the gate lines. The gate drive 7 drives the gate lines of the display area 5a, and the data drivers 8 drive the data lines. The data drivers 8 are cascade-connected. The timing controller 6 supplies gate side control signals 9 to the gate driver 7, and further supplies data side control signals 11 to the data drivers 8 so as to control the gate driver 7 and the data drivers 8.

In this embodiment, the data drivers 8 are cascade connected, and the image data are transferred to a desired data driver 8 in such a manner that each data driver 8 receives the image data from the data driver 8 adjacent on the left side and/or transfers the image data to the data driver 8 adjacent on the right side. It should be noted that compressed data 10 are transferred between the data drivers 8 in this embodiment. The transfer of the compressed image data 10 between the data drivers 8 effectively reduces the number of interconnections connected between the adjacent data drivers 8, and also improves the effective image transfer speed.

More specifically, in this embodiment, the timing controller 6 is provided with a compression section 6a for generating the compressed image data 10 by performing compression processing on the image data 3 transferred from the image drawing unit 2. The compression section 6a transfers the compressed image data 10 to the leftmost data driver 8. The leftmost data driver 8 decompresses the compressed image data 10 to generate decompressed image data when the received compressed image data 10 are addressed to itself, and drives the data lines in response to the generated decompressed image data. On the other hand, when the received data are not addressed to itself, the leftmost data driver 8 transfers the compressed image data 10 as they are to the data driver 8 adjacent on the right (that is, the second data driver from the left): Similarly, the second data driver 8 from the left decompresses the compressed image data 10 to generate the decompressed image data when the received compressed image data 10 are addressed to itself, and, if not so, transfers the compressed image data 10 as they are to the data driver 8 adjacent on the right. Subsequently, the compressed image data 10 are delivered to each data driver 8 by the same procedure, and the decompressed image data are generated within each data driver 8. Is should be noted that the rightmost data driver 8 does not necessarily perform the operation for transferring the compressed image data 10 to another data driver 8.

Figure 2:
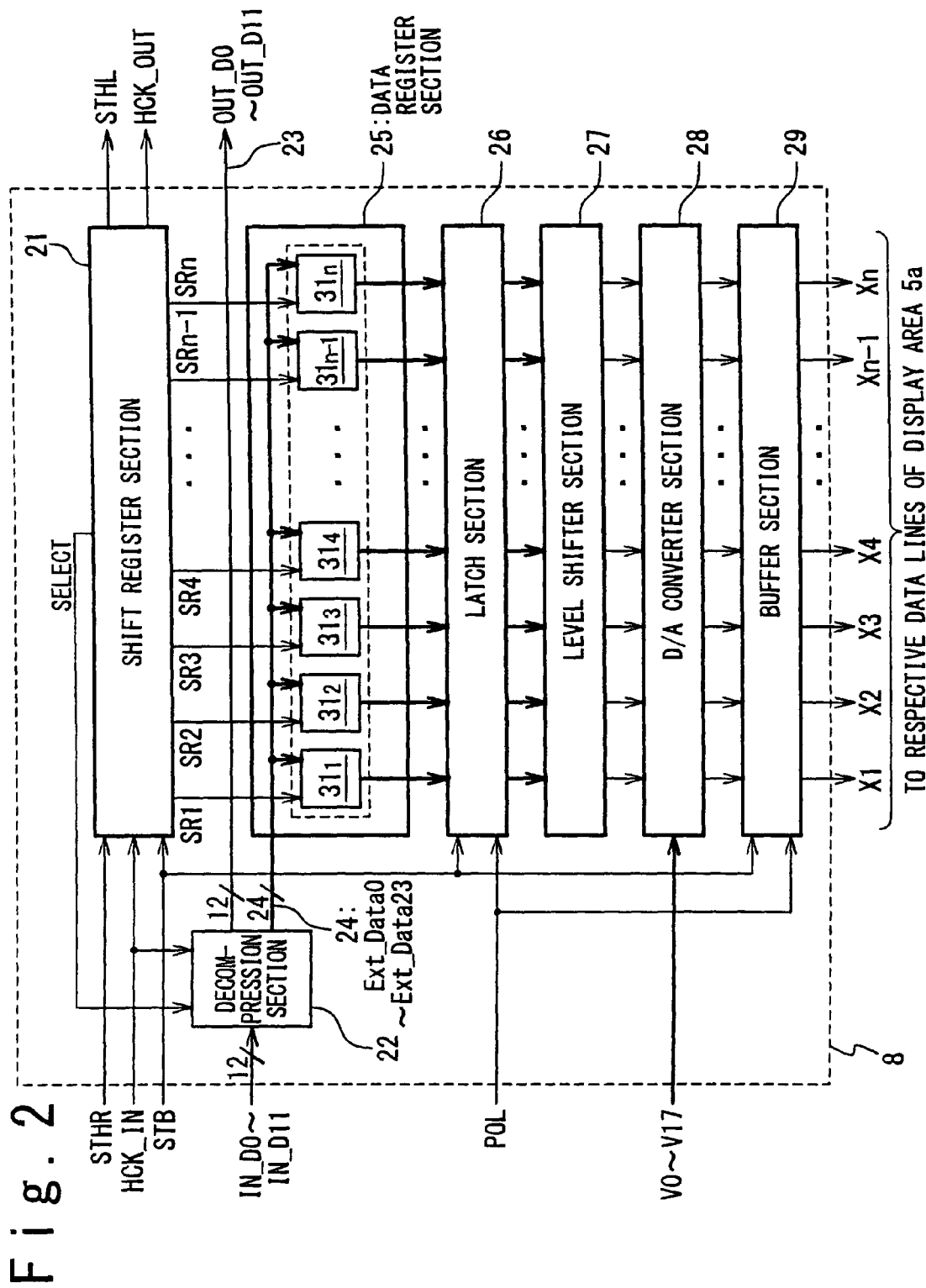
FIG. 2 is a block diagram showing an exemplary configuration of a data driver in the first embodiment.

FIG. 2 is a block diagram showing an exemplary configuration of each data driver 8 in this embodiment. In this embodiment, all data drivers 8 have the same configuration. Each data driver 8 receives a strobe signal STB from the timing controller 6, and receives the compressed image data 10, a start pulse signal STHR, and a clock signal HCL_IN from the data driver 8 adjacent on the left or the timing controller 6. The start pulse signal STHR indicates whether each data driver 8 should fetch the compressed image data 10; upon detecting the assertion of the start pulse signal STHR, each data driver 8 generates the decompressed image data by fetching the compressed image data 10. In this embodiment, the compressed image data 10 are 12 bit data, and the decompressed image data are 24 bit data. In FIG. 2, the respective bits of the compressed image data 10 received from the data driver 8 on the left or the timing controller 6 are denoted by IN_D0 to IN_D11, respectively, and the respective bits of the decompressed image data are denoted by Ext_Data0 to Ext_Data23, respectively. In this embodiment, the grayscale level of each liquid crystal pixel is represented by 24 bits. In other words, the grayscale level of each liquid crystal pixel is designated by the decompressed image data Ext_Data0 to Ext_Data23.

The data driver 8 includes a shift register section 21, a decompression section 22, an external bus 23, an internal bus 24, a data register section 25, a latch section 26, a level shifter section 27, a D/A converter section 28, and a buffer section 29.

The shift register section 21 performs a shift operation in response to the start pulse signal STHR, the clock signal HCL_IN, and the strobe signal STB, and asserts sequentially the latch signals SR1 to SRn (which are pulled up to the high level in this embodiment). The start pulse signal is used to instruct each data driver 8 to fetch the image data, and in this embodiment, each driver signal 8 fetches the compressed image data 10 in response to the assertion of the start pulse signal STHR, and generates the decompressed image data. In addition, the shift register section 21 feeds the start pulse signal STHR and a clock signal HCL_OUT to the data driver 8 adjacent on the right. Further, the shift register section 21 also functions as a control section for selecting the operation of the decompression section 22 in response to the start pulse signal STHR and generating a selection signal SELECT. The select signal SELECT is used to control the decompression section 22, and more particularly to instruct the generation of the decompressed image data Ext_Data0 to Ext_Data23. The shift register section 21 generates the select signal SELECT from the start pulse signals STHR and STHL. Specifically, the select signal SELECT is asserted when the start pulse signal STHR is asserted, and is negated when the clock signal HCL_IN is pulled down with the start pulse signal STHL asserted.

The decompression section 22 is a circuitry having a function of decompressing the compressed image data IN_D0 to IN_D11 to generate the decompressed image data Ext_Data0 to Ext_Data23. The operation of this decompression section 22 is switched in response to the select signal SELECT. When the select signal SELECT is asserted, the decompression section 22 decompresses the compressed image data IN_D0 to IN_D11 to generate the decompressed image data Ext_Data0 to Ext_data23, and outputs the decompressed image data Ext_Data0 to Ext_data23 to the internal bus 24. On the other hand, when the select signal SELECT is negated, the decompression section 22 outputs the compressed image data IN_D0 to IN_D11 as they are to the external bus 23.

The external bus 23 is used for transferring the compressed image data IN_D0 to IN_D11 to the data driver 8 adjacent on the right. In FIG. 2, the compressed image data outputted to the external bus 23 and then transferred to the data driver 8 adjacent on the right are denoted by the reference symbols OUT_D0 to OUT_D11. On the other hand, the internal bus 24 is used for transferring the decompressed image data Ext_Data0 to Ext_Data23 to the data register section 25 from the decompression section 22.

The data register section 25, the latch section 26, the level shifter section 27, the D/A converter section 28, and the buffer section 29 are a drive circuitry for driving the data lines of the display area 5a in response to the decompressed image data Ext_Data0 to Ext_Data23. In this embodiment, n data lines are driven by one data driver 8. In FIG. 2, the n data lines are denoted by the reference symbols X1 to Xn.

More specifically, the data register section 25 latches the decompressed image data Ext_Data0 to Ext_Data23 transferred sequentially from the decompression section 22. In particular, the data register section 25 includes latch circuits $31_1$ to $31n$ which are associated with the data lines X1 to Xn, respectively. Each latch circuit $31_i$ receives and stores the decompressed image data Ext_Data0 to Ext_Data23 associated with the liquid crystal pixel connected to the associated data line Xi when a latch signal SRi fed from the shift register section 21 is asserted.

The latch section 26 latches the decompressed image data Ext_Data0 to Ext_Data23 from the data register section 25. The latch section 26 operates in response to the strobe signal STB, and latches the decompressed image data Ext_Data0 to Ext_Data23 simultaneously from all latch circuits $31_1$ to $31n$ in response to the assertion of the strobe signal STB.

The level shifter section 27 is a circuitry for providing signal level matching between the output signals of the latch circuits $31_1$ to $31n$ and the input signals of the D/A converter section 28. The decompressed image data outputted from the latch circuits $31_1$ to $31n$ are transferred to the D/A converter section 28 through the level shifter section 27.

The D/A converter section 28 generates the grayscale voltages having voltage levels corresponding to the grayscale levels indicated by the decompressed image data by performing digital/analogue conversion on the decompressed image data transferred from the latch circuits $31_1$ to $31n$. In particular, the D/A converter section 28 generates the grayscale voltages corresponding to the respective allowed values of the decompressed image data in response to grayscale voltage reference voltages V0 to V17 which are externally supplied. The grayscale voltage reference voltages V0 to V17 are a set of voltages used for controlling the grayscale voltages to be generated. Further, the D/A converter section 28 selects the grayscale voltages corresponding to the grayscale levels indicated by the decompressed image data, and outputs the corresponding grayscale voltages.

The buffer section 29 includes buffers (for example, voltage followers comprised of operational amplifiers) corresponding to the respective data lines X1 to Xn, and drives the data lines X1 to Xn with drive voltages which are substantially identical to the corresponding grayscale voltages fed from the D/A converter section 28. Thereby, the liquid crystal pixels connected to the data lines X1 to Xn are driven.

Figure 3:
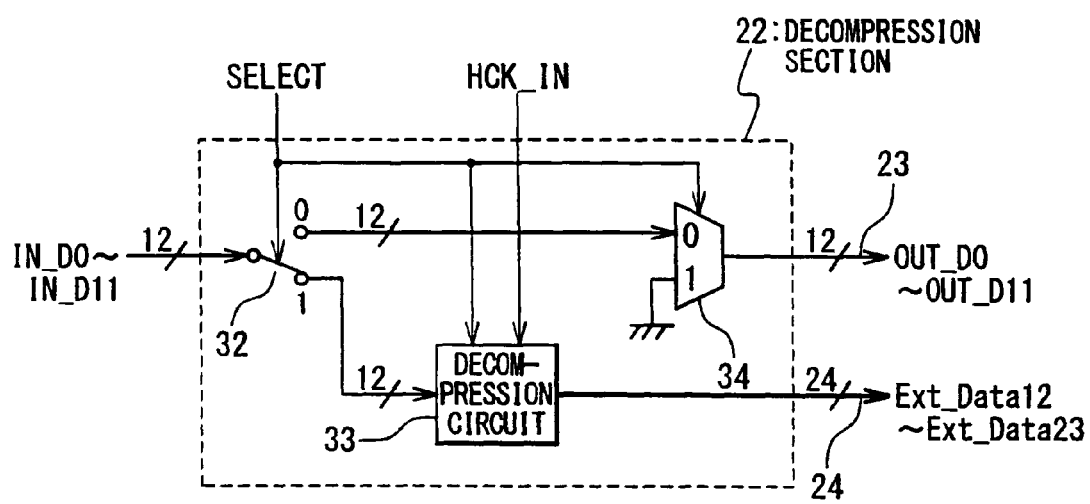
FIG. 3 is a block diagram showing an exemplary configuration of a decompression section in the first embodiment.

FIG. 3 is a block diagram showing an exemplary configuration of the decompression section 22. The decompression section 22 includes a switch 32, a decompression circuit 33, and a selector 34. The switch 32 supplies the compressed image data IN_D0 to IN_D11 to the decompression circuit 33 or the selector 34 in response to the select signal SELECT. In detail, the switch 32 transfers the compressed image data IN_D0 to IN_D11 to the decompression circuit 33 when the selected signal SELECT is asserted, and transfers the compressed image data IN_D0 to IN_D11 to the selector 34 when the select signal SELECT is negated.

The decompression circuit 33 receives the compressed image data IN_D0 to IN_D11 and decompresses the compressed image data IN_D0 to IN_D11 to generate the decompressed image data Ext_Data0 to Ext_Data23. The decompressed image data Ext_Data0 to Ext_Data23 are fed to the internal bus 24. The decompressed image data Ext_Data0 to Ext_Data23 are generated in synchronization with the clock signal HCK_IN. As described above, the decompressed image data Ext_Data0 to Ext_Data23 fed to the internal bus 24 are transmitted to the data register section 25. The decompression circuit 33 is supplied with the select signal SELECT, and the decompression circuit 33 is configured to decompress the compressed image data IN_D0 to IN_D11 only when the select signal SELECT is asserted. This effectively reduces the power consumption in the decompression circuit 33.

The selector 34 selects the compressed image data IN_D0 to IN_D11 or data of all "0" in response to the select signal SELECT, and outputs the selected data to the external bus 23. In detail, the selector 34 outputs the data of all "0" to the external bus 23 when the select signal SELECT is asserted, and outputs the compressed image data IN_D0 to IN_D11 to the external bus 23 when the select signal SELECT is negated. It should be noted that the compressed image data outputted to the external bus 23 are denoted by the reference symbols OUT_D0 to OUT_D11 in FIG. 3.

Although the data outputted to the external bus 23 are selected between the compressed image data IN_D0 to IN_D11 and the data of all "0" in the configuration of FIG. 3, data of any fixed value may be used instead of the data of all "0". For example, the data outputted to the external bus 23 may be selected between the compressed image data IN_D0 to IN_D11 and the data of all "1".

Here, it should be noted that the fixation of the output of the external bus 23 to a predetermined value (for example, all "0") is effective for the reduction of the consumption power when the select signal SELECT is asserted. The fact that the select signal SELECT is asserted in a certain data driver 8 implies that the compressed image data IN_D0 to IN_D11 are to be fetched in the certain data driver 8 to generate the decompressed image data Ext_Data0 to Ext_Data23, and in this case, there is no need to transfer the compressed image data from the certain data driver 8 to the data driver 8 adjacent on the right. In such a case, the output of the external bus 23 of the certain data driver 8 is fixed to the predetermined value, thereby fixing the voltage levels of:

(1) the signal lines of the external buses 23 of the certain data driver 8 and the data driver(s) 8 located on the right from the certain data driver 8, and (2) the interconnections connected between adjacent two data drivers 8 out of the certain data driver 8 and the data driver(s) 8 located on the right from the certain data driver 8. Fixedly holding the voltage levels of the respective signal lines of the external bus 23 as well as the respective interconnections between adjacent two data drivers 8 eliminates the necessity of the electric power for driving the respective signal lines and interconnections so that the power consumption of the liquid crystal display device 1 is reduced.

Next, an exemplary operation of the liquid crystal display device 1 in the first embodiment will be described. Referring to FIG. 1, one feature of the liquid crystal display device 1 of this embodiment is that the image data to be transferred to the leftmost data driver 8 from the timing controller 6 and the image data transferred between adjacent two data drivers 8 are compressed. More specifically, the compressed imaged data 10 are transferred to the leftmost data driver 8 and then sequentially transferred from one data driver 8 to another. The compression of the image data to be transferred between the adjacent data drivers 8 effectively reduces the effective data amount necessary for the transfer of the image data, and this allows reducing the number of the interconnections on the glass substrate and/or the necessary data transfer rate.

To realize such an operation, each data driver 8 is configured to decompress the compressed image data IN_D0 to IN_D11 to generate the decompressed image data Ext_Data0 to Ext_Data23 by the decompression section 22 which is integrated within each data driver 8. It should be noted that the decompressed image data to be generated are larger in data amount than the compressed image data 10. In this embodiment, the decompressed image data Ext_Data0 to Ext_Data23 are 24 bit data, and the compressed image data IN_D0 to IN_D11 are 12 bit data. Consequently, each data driver 8 is configured to be adapted to the difference of the size between the decompressed image data Ext_Data0 to Ext_Data23 and the compressed image data IN_D0 to IN_D11.

Hence, in this embodiment, each data driver 8 is configured such that a data transferable amount (that is, the data transferable amount to the adjacent data driver 8) per unit time from the decompression section 22 to the data register section 25 is larger than the data transferable amount per unit time from the decompression section 22 to the adjacent data driver 8. In this embodiment, the number of signal lines of the internal bus 24 is 24, and the number of signal lines of the external bus 23 is 12, and the data transfer from the decompression section 22 to the data register section 25 and the data transfer from the decompression section 22 to the adjacent data driver 8 are performed in synchronization with the same clock signal HCK_IN. As a result, the data transferable amount per unit time from the decompression section 22 to the data register section 25 is two times that of the data transferable amount per unit time from the decompression section 22 to the external bus 23.

It should be noted, however, that the numbers of bits of the decompressed image data and the compressed image data are not limited to 24 and 12, respectively. The number of the signal lines of the internal bus 24 and the number of signal lines of the external bus 23 may be selected in conformity with the numbers of bits of the decompressed image data and the compressed image data.

Figure 4:
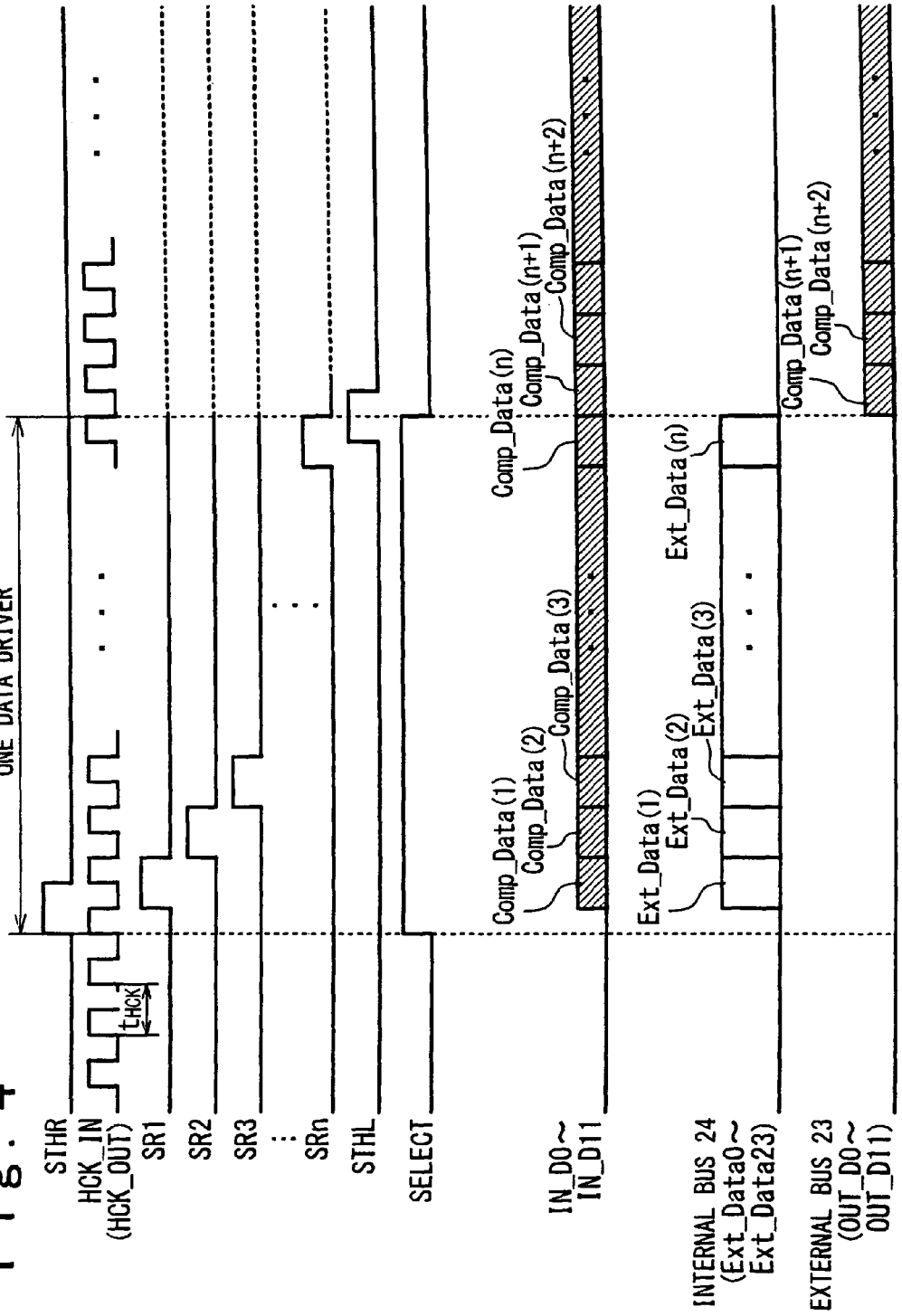
FIG. 4 is a timing chart showing an exemplary operation of the data driver in the first embodiment.

Hereinafter, a specific example of the operation of the data driver 8 in the first embodiment will be described. FIG. 4 is a timing chart showing a specific example of the operation of the data driver 8 in the first embodiment. Although the operation of one data driver 8 (hereinafter, referred to as "target data driver 8") is shown in FIG. 4, it should be noted that all data drivers 8 operate in the same manner.

When the shift pulse signal STHR is asserted, the select signal SELECT is also asserted. In response to the assertion of the select signal SELECT, the decompression circuit 33 is selected by the switch 32 of the decompression section 22, and the compressed image data IN_D0 to IN_D11 are transmitted sequentially to the decompression circuit 33. It should be noted that Comp_Data (i) indicates the compressed image data associated with the data line Xi in FIG. 4. The decompression circuit 33 decompresses the compressed image data IN_D0 to IN_D11 to generate the decompressed image data Ext_Data0 to Ext_Data23. It should be noted that, in FIG. 4, Ext_Data (i) indicates the decompressed image data Ext_Data0 to Ext_Data23 corresponding to the data line Xi, that is, the decompressed image data Ext_Data0 to Ext_Data23 stored in the latch circuit 31$_i$.

When the shift pulse signal STHR is asserted, the latch signals SR1 to SRn are sequentially asserted in synchronization with the clock signal HCK_IN. In this embodiment, the latch signals SRi to SRn are asserted in synchronization with the pull-down of the clock signal HCK_IN. When the latch signal SR1 is asserted, the latch circuit 31$_i$ latches the decompressed image data Ext_Data (i).

At this time, all of the signal lines of the external bus 23 are fixed to the low level. That is, the external bus 23 is set to all "0". This results in that the voltage levels of the respective signal lines of the external bus 23 of the target data driver 8 are fixed and the power consumption is effectively reduced.

When the clock signal HCK_IN is pulled up after the assertion of the latch signal SRn, the shift register section 21 asserts the shift pulse signal STHL. In response to the assertion of the shift pulse signal STHL, the shift pulse signal STHL inputted to the data driver 8 adjacent on the right to the target data driver 8 is asserted, and the same operation as described above is performed in the data driver 8 adjacent on the right. When the clock signal HCK_IN is pulled down with the shift pulse signal STHL asserted, the select signal SELECT is negated.

Subsequently, the compressed image data associated with the data driver 8 adjacent on the right starts to be supplied. In FIG. 4, the compressed image data associated with the data line Xi of the data driver 8 adjacent on the right is denoted by Comp_Data (n+1). At this time, since the select signal SELECT is negated, the compressed image data Comp_Data (n+1) are transferred as they are to the data driver 8 adjacent on the right through the external bus 23. Even when the compressed image data Comp_Data (n+1) associated with the data line Xi of the data driver 8 adjacent on the right are supplied, the decompressed image data are not generated in the target data driver 8. In the adjacent data driver 8, the decompressed image data are generated in response to the compressed image data Comp_Data (n+1), and the generated decompressed image data are transferred to the latch circuit 31$_i$. With respect to other data drivers 8, the transfer of the decompressed image data to the latch circuits 31$_1$ to 31$n$ is performed by the same processing.

When the transfer of the decompressed image data to all the latch circuits 31$_1$ to 31$n$ of all the data drivers 8 is completed, the data lines are driven in response to the transferred decompressed image data in the next horizontal period of the horizontal period in which the decompressed image data are transferred.

As described above, the image data transferred to the leftmost data driver 8 from the timing controller 6 and the image data transferred between the adjacent data drives 8 are compressed in the liquid crystal display device of this embodiment. This effectively reduces the effective data amount necessary for the transfer of the image data, and therefore, the number of interconnections on the glass substrate and/or the necessary data transfer rate can be reduced.

Second Embodiment

Figure 5:
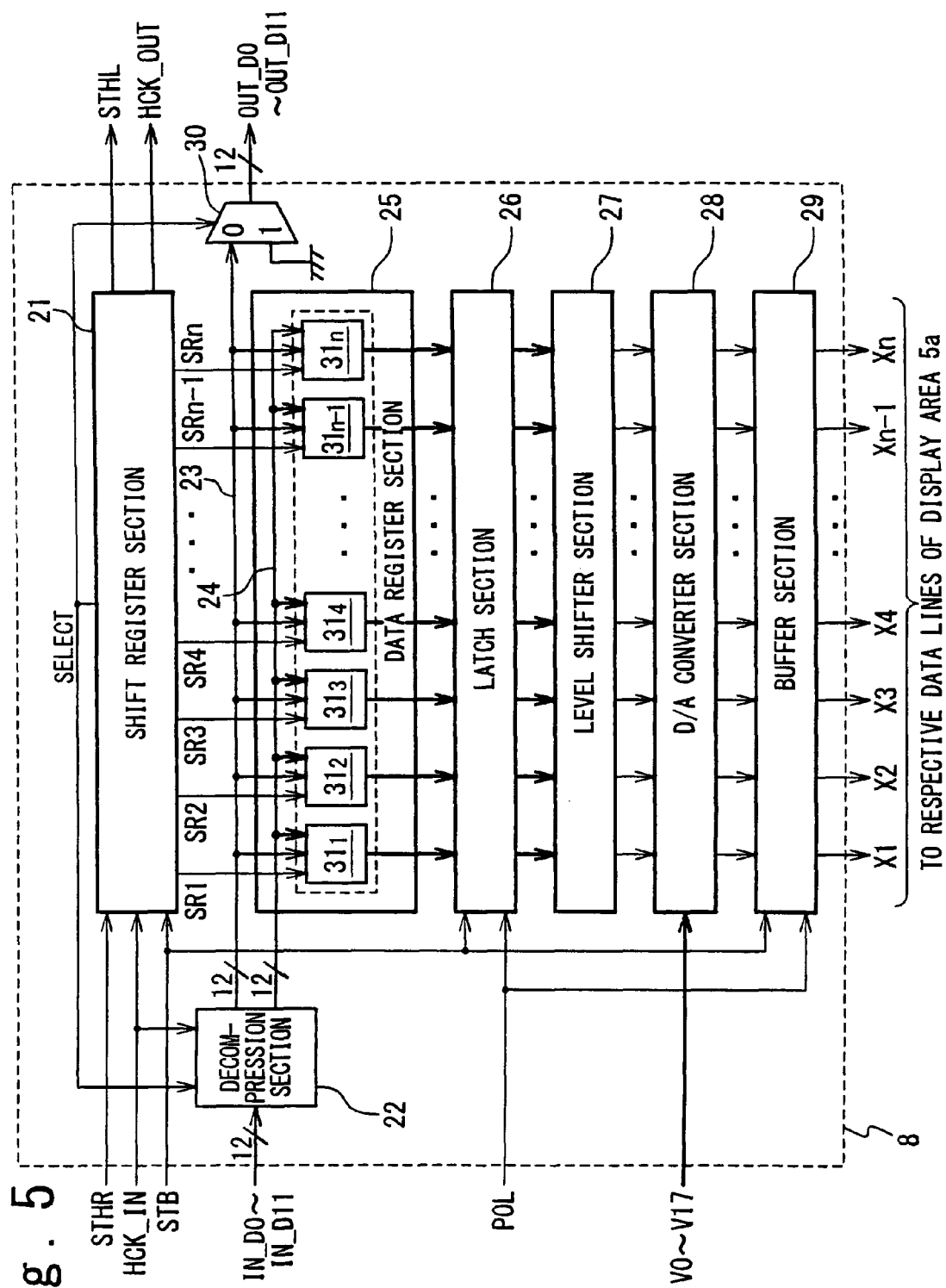
FIG. 5 is a block diagram showing an exemplary configuration of the data driver in a second embodiment.

FIG. 5 is a diagram showing the configuration of a liquid crystal display device 1, particularly, the configuration of each data driver 8 of a second embodiment of the present invention. The configuration of the data drivers 8 of the second embodiment is approximately the same as that of the first embodiment. The difference is that, in the data driver 8 of the second embodiment, the transfer of decompressed image data to the data register section 25 also uses the external bus 23 in addition to the internal bus 24. In detail, in this embodiment, compressed image data IN_D0 to IN_D11 are 12 bit data, and the decompressed image data Ext_Data0 to Ext_Data23 generated from the compressed image data IN_D0 to IN_D11 are 24 bit data. On the other hand, the external bus 23 and the internal bus 24 are both provided with 12 signal lines, and each of latch circuits 31$_1$ to 31$n$ of the data register section 25 is connected to both of the external bus 23 and the internal bus 24. The transfer of the compressed image data IN_D0 to IN_D11 from the decompression section 22 to the adjacent data driver 8 uses only the external bus 23, while the transfer of the decompressed image data Ext_Data0 to Ext_Data23 from the decompression section 22 to the data register section 25 uses both of the external bus 23 and the internal bus 24. Such a configuration is effective for reducing the number of signal lines of the internal bus 24.

Although the external bus 23 and the internal bus 24 are both provided with 12 signal lines in this embodiment, the number of the signal lines of the external bus 23 and the internal bus 24 may be variously changed. In one embodiment, when the compressed image data are α bit data and the decompressed image data are β bit data, the external bus 23 is provided with a signal lines, and the internal bus 24 is provided with (β-α) signal lines.

Figure 6:
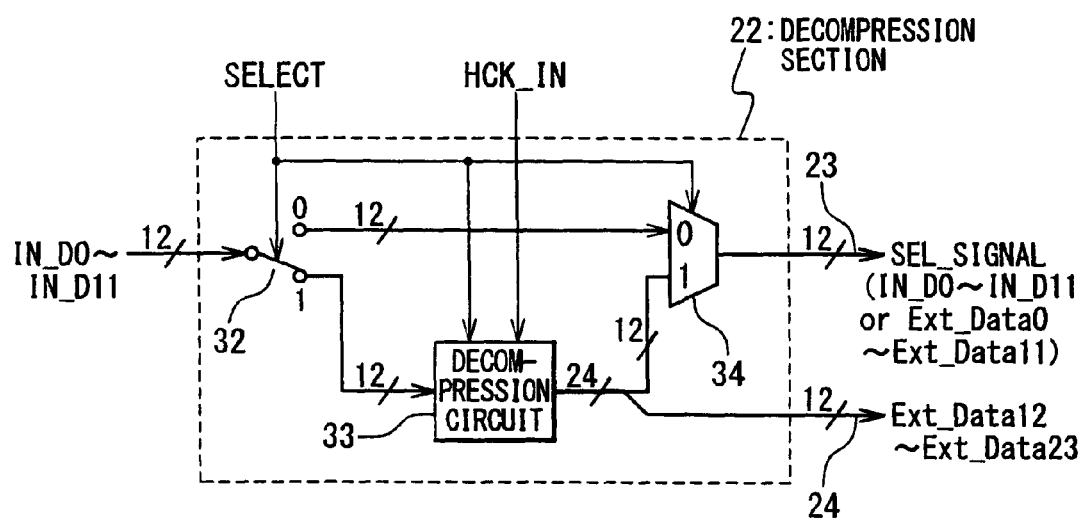
FIG. 6 is a block diagram showing an exemplary configuration of the decompression section in the second embodiment.

Based on the modifications described above, the configuration of the decompression section 22 is also modified. FIG. 6 is a block diagram showing the configuration of the decompression section 22 in this embodiment. The difference between the configuration of the decompression section 22 of FIG. 6 and that of FIG. 3 is that half the bits (Ext_Data0 to Ext_Data11) out of the decompressed image data Ext_Data0 to Ext_Data23 are supplied to a selector 34, and the remaining half the bits (Ext_Data12 to Ext_Data23) are outputted to the internal bus 24. The selector 34 outputs the decompressed image data Ext_Data0 to Ext_Data11 to the external bus 23 when the select signal SELECT is asserted, and outputs the compressed image data IN_D0 to IN_D11 to the external bus 23 when the select signal SELECT is negated.

Referring back to FIG. 5, the external bus 23 is connected with a selector 30 in this embodiment. The selector 30 transfers the compressed image data IN_D0 to IN_D11 from the decompression section 22 to the adjacent data driver 8 in response to the select signal SELECT or transfers a predetermined fixed value (for example, data of all "0") to the adjacent data driver 8. The fact that the output of the select 30 is fixed to the predetermined value (for example, the data of all "0") when the selector signal SELECT is asserted is effective for the reduction of the power consumption as is the case of the first embodiment. Fixing the output of the selector 30 of a certain data driver 8 to the predetermined value allows fixing the voltage levels of:

(1) the respective signal lines of the external bus 23 of the data driver(s) 8 located on the right from the relevant data driver 8, and (2) the respective interconnections connected between two adjacent data drivers 8 out of the certain data driver 8 and the data driver(s) located on the right from the relevant data driver 8. Fixedly holding the voltage levels of the respective signal lines of the external bus 23 and the respective interconnections connected between adjacent two data drivers 8 eliminates the necessity of the electric power for driving the signal lines and interconnections, thereby reducing the power consumption of the liquid crystal display device 1.

Figure 7:
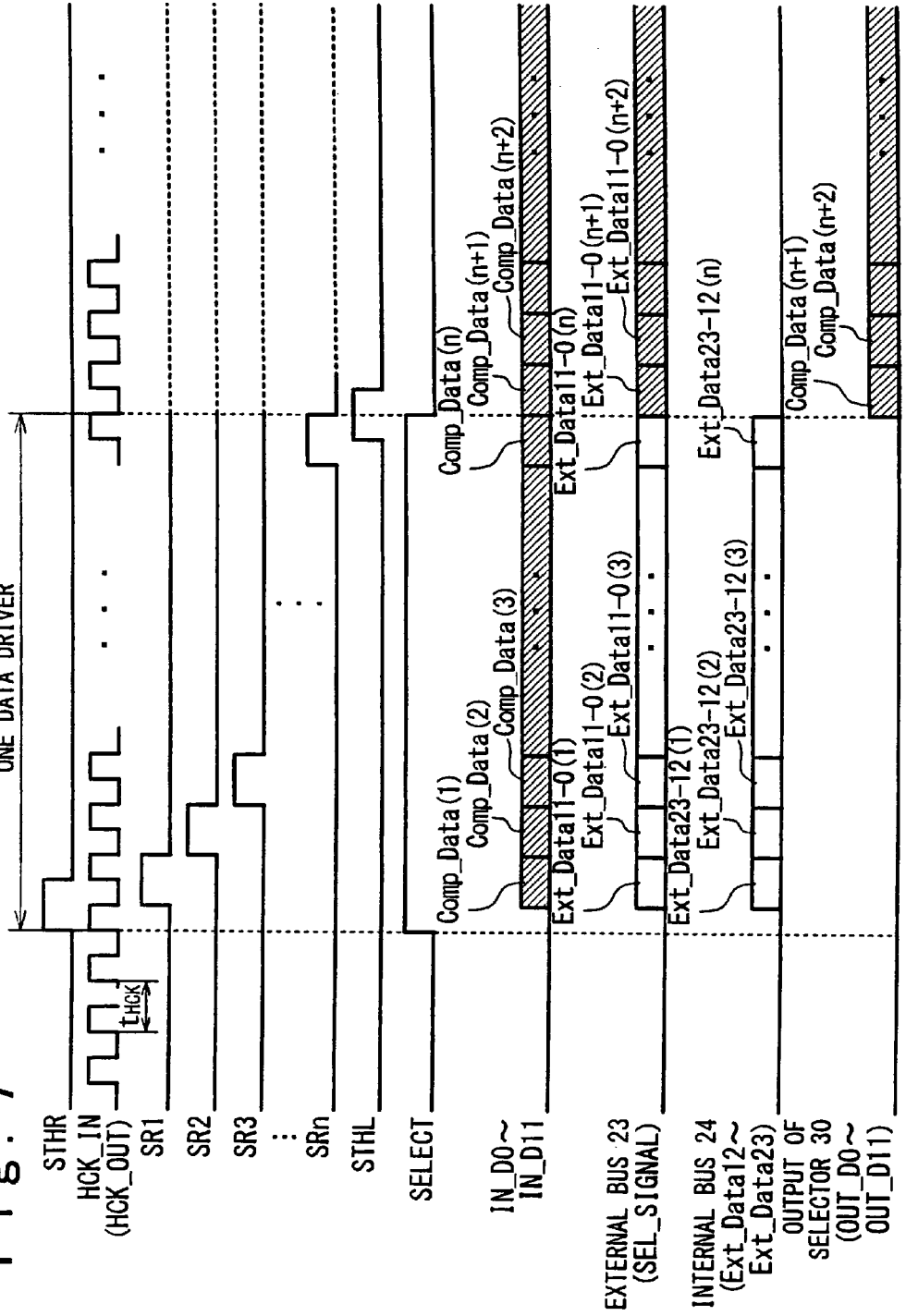
FIG. 7 is a timing chart showing an exemplary operation of the data driver in the second embodiment.

FIG. 7 is a timing chart showing a specific example of the operation of the data driver 8 in the second embodiment. It should be noted that, although FIG. 7 shows the operation of one data driver 8 (target data driver 8), all data drivers 8 operate in the same manner.

When the shift pulse signal STHR is asserted, the select signal SELECT is also asserted. In response to the assertion of the select signal SELECT, the decompression circuit 33 is selected by the switch 32 of the decompression section 22, and the compressed image data IN_D0 to IN_D11 are transferred sequentially to the decompression circuit 33. It should be noted that Comp_Data (i) indicates the compressed image data associated with the data line Xi in FIG. 7. The decompression circuit 33 decompresses the compressed image data IN_D0 to IN_D11 to generate decompressed image data Ext_Data0 to Ext_Data23 sequentially. Here, it should be noted that, in FIG. 7, Ext_Data11-0 ($i$) indicates the lower 12 bits (that is, decompressed image data Ext_Data0 to Ext_Data11) of the decompressed image data associated with the data line Xi and Ext_Data23-12($i$) indicates the higher 12 bits (that is, decompressed image data Ext_Data12 to Ext_data23) of the decompressed image data associated with the data line Xi.

When the shift pulse signal STHR is asserted, the latch signals SR1 to SRn are sequentially asserted in synchronization with the clock signal HCK_IN. In this embodiment, the latch signals SR1 to SRn are asserted in synchronization with the pull-down of the clock signal HCK_IN. When the latch signal SRi is asserted, the latch circuit $31_i$ latches the decompressed image data Ext_Data11-0($i$) from the external bus 23, and latches decompressed image data Ext_Data23-12($i$) from the internal bus 24. As a result, each of the latch circuits $31_1$ to $31n$ latches the decompressed image data Ext_Data0 to Ext_Data23 of 24 bits.

At this time, all the interconnections connected to the output of the selector 30 are fixed to the low level. That is, the output of the selector 30 is set to all "0". Thereby, the voltage levels of the interconnections connected between the target data driver 8 and the data driver 8 adjacent on the right are fixed, and the power consumption is effectively reduced.

When the clock signal HCK_IN is pulled up after the assertion Of the latch signal SRn, the shift register section 21 asserts the shift pulse signal STHL. In response to the assertion of the shift pulse signal STHL, the shift pulse signal STHR fed to the data driver 8 adjacent on the right to the target data driver 8 is asserted, and the same operation as described above is performed in the data driver 8 adjacent on the right. When the clock signal HCK_IN is pulled down with the shift pulse signal STHL asserted, the select signal SELECT is negated.

Subsequently, the compressed image data associated with the data driver 8 adjacent on the right begins to be supplied. In FIG. 7, the compressed image data associated with the data line Xi of the data driver 8 adjacent on the right are denoted by Comp_Data (n+i). Here, since the select signal SELECT is negated, the compressed image data Comp_Data (n+i) are transferred as they are to the data driver 8 adjacent on the right through the external bus 23. Even when the compressed image data Comp_Data (n+i) associated with the data line Xi of the data driver 8 adjacent on the right are supplied, the decompressed image data are not generated in the target data driver 8. In the adjacent data driver 8, decompressed image data are generated in response to the compressed image data Comp_Data (n+i), and the generated decompressed image data are transferred to the latch circuit $31_i$.

With respect to the other data drivers 8, the transfer of the decompressed image data to the latch circuits $31_1$ to $31n$ is performed by the same procedure.

After the transfer of the decompressed image data to all latch circuits $31_1$ to $31n$ of all the data drivers 8 is completed, the data lines associated with the transferred decompressed image data is performed in the next horizontal period of the horizontal period in which the decompressed image data are transferred.

As described above, the image data transferred to the leftmost data driver 8 from the timing controller 6 and the image data transferred between the adjacent data drives 8 are compressed in the liquid crystal display device 1 of the second embodiment similarly to the first embodiment. As a result, the effective data amount necessary for the transfer of the image data is reduced, and therefore, the number of interconnections on the glass substrate and/or the necessary data transfer rate can be reduced. In addition, the liquid crystal display device 1 of the second embodiment, which can reduce the number of the signal lines of the internal bus 24, allows reducing the circuit scale of the data driver 8, and this is advantageous for reducing the cost.

Third Embodiment

Device Configuration

In a third embodiment, compressed image data 10 is generated by block coding in which compressed processing is performed in units of blocks, each including a plurality of pixels. In this embodiment, each block includes four pixels located in the same horizontal line, which are arrayed in four rows and one column. It should be noted, however that the number of pixels contained in one block may be other than four. For example, each block may include pixels arrayed in m rows (m is 4 or more of integer) and one column. Based on the adoption of the block coding, a compression section 6a of a timing roller 6 illustrated in FIG. 1 is configured to be adapted to block coding.

Figure 8:
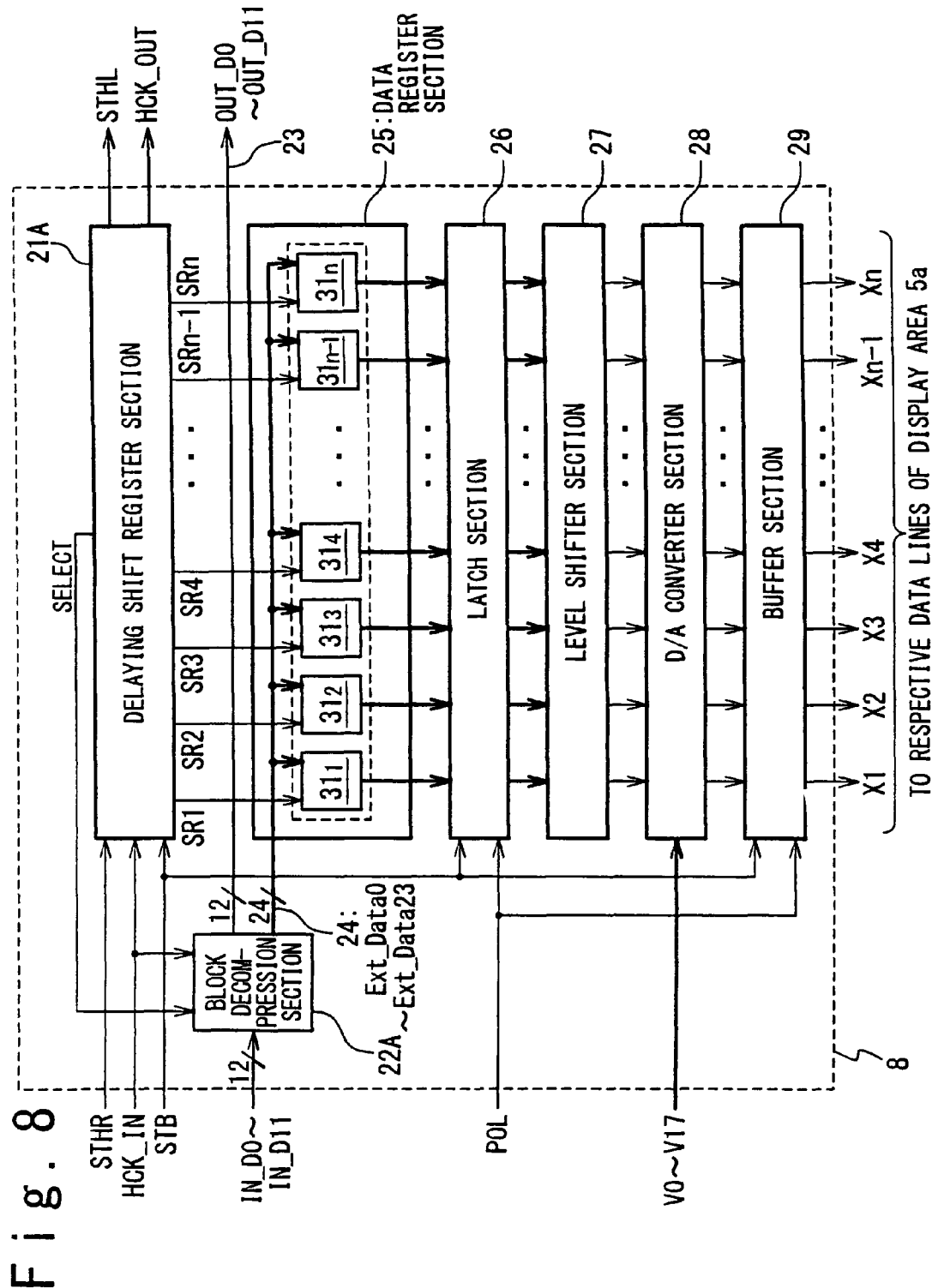
FIG. 8 is a block diagram showing an exemplary configuration of the data driver in a third embodiment.

In addition, as shown in FIG. 8, a delaying shift register 21A and a block decompression section 22A adapted to block coding are used in the data driver 8. The function of the delaying shift register 21A is approximately the same as the shift register 21 of the first and second embodiments. The difference is that the delaying shift register 21 has a function of delaying timings at which the latch signals SR1 to SRn are sequentially asserted by a desired number of clock cycles (four clock cycles in this embodiment) after the start pulse signal STHR is asserted.

Figure 9:
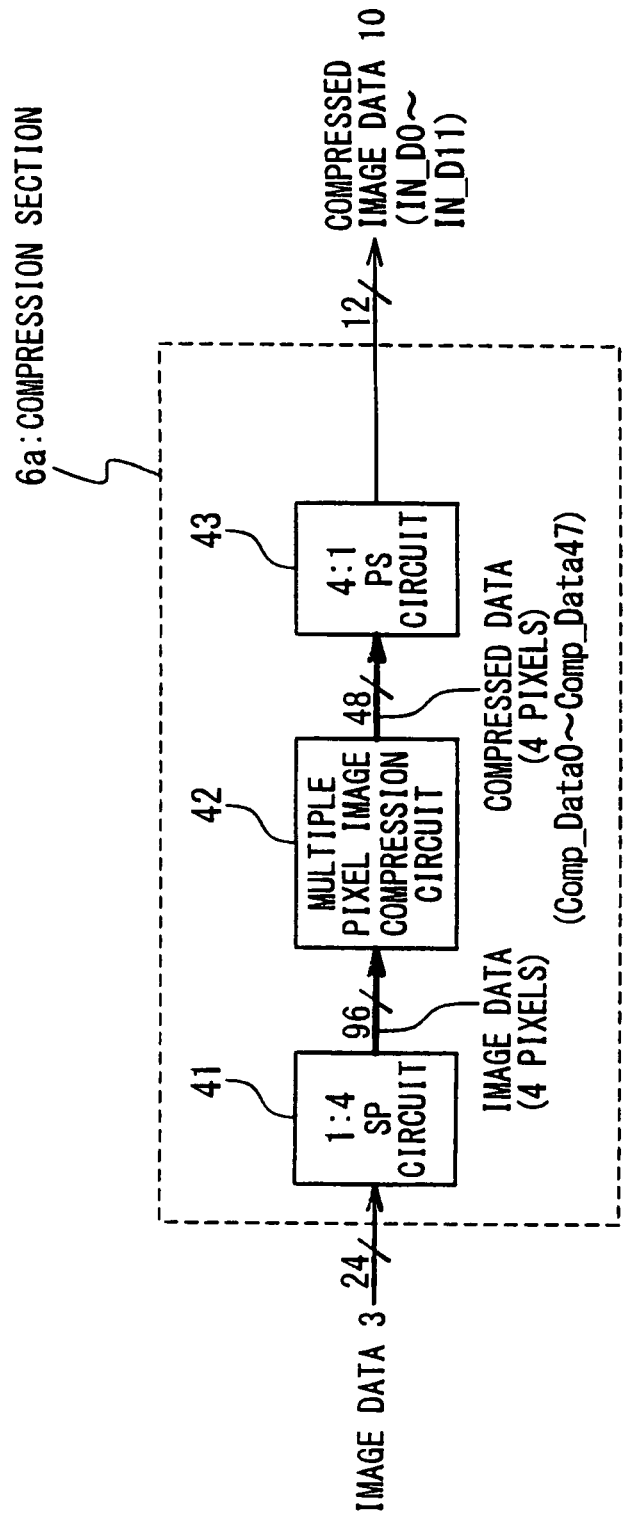
FIG. 9 is a block diagram showing an exemplary configuration of a compression section of a timing controller in the third embodiment.

FIG. 9 is a block diagram showing an exemplary configuration of the compression section 6a of the timing controller 6 in this embodiment. In this embodiment, the compression section 6a includes a serial-parallel conversion circuit 41, a multi-pixel image compression circuit 42, and a parallel-serial conversion circuit 43.

The serial parallel conversion circuit 41 performs a serial parallel conversion for the image data 3 fed from the image drawing unit 2. In this embodiment, the image data 3 received from the image drawing unit 2 are 24 bit data, and the gray-scale level of each pixel is expressed by 24 bits in the image data 3. The serial parallel conversion circuit 41 performs serial-parallel conversion of a ratio 1:4 on the image data 3, and supplies the image data subjected to the serial parallel conversion to the multi-pixel image compression circuit 42. The multi-pixel image compression circuit 42 receives the image data of four pixels through 96 signal lines at the same time.

The multi-pixel image compression circuit 42 generates 48-bit compressed image data Comp_Data0 to Comp_Data47 by compressing the image data received from the serial parallel conversion circuit 41 by block coding. The compressed image data Comp_Data0 to Comp_Data47 indicate the grayscale levels of four pixels as a whole. The compression processing performed in the multi-pixel image compression circuit 42 will be described in detail later.

The parallel serial conversion circuit 43 performs parallel-serial conversion of a ratio of 4:1 on the 48-bit compressed image data Comp_Data0 to Comp_Data 47, and generates 12-bit compressed image data IN_D0 to IN_D11. The compressed image data IN_D0 to IN_D11 generated by the parallel-serial conversion circuit 43 are transferred to the leftmost data driver 8.

FIG. 10 is a block diagram showing an exemplary configuration of the block decompression section 22A integrated within each data driver 8. In this embodiment, the block decompression section 22A includes a switch 51, a serial-parallel conversion circuit 52, a multi-pixel image decompression circuit 53, a parallel-serial conversion circuit 54, and a selector 55.

The switch 51 is responsive to the select signal SELECT for feeding the compressed image data IN_D0 to IN_D11 to the serial-parallel conversion circuit 52 or to the selector 55. In detail, the switch 51 transfers the compressed image data IN_D0 to IN_D11 to the serial parallel conversion circuit 52 when the select signal SELECT is asserted, and transfers the compressed image data IN_D0 to IN_D11 to the selector 55 when the select signal SELECT is negated.

The serial-parallel conversion circuit 52 performs serial-parallel conversion of a ratio of 1:4 on the 12-bit compressed image data IN_D0 to IN_D11, thereby "reproducing" the 48-bit compressed image data Comp_Data0 to Comp_Data47. The "reproducing" means that the compressed image data Comp_Data0 to Comp_Data47 generated by the serial-parallel conversion circuit 52 are identical to the compressed image data generated in the multi-pixel image compression circuit 42 of the compression section 6a of the timing controller 6. The serial-parallel conversion circuit 52 is supplied with the clock signal HCK_IN, and the serial-parallel conversion circuit 52 operates in synchronization with the clock signal HCK_IN. Further, the serial parallel conversion circuit 52 is supplied with the select signal SELECT, and operates only when the select signal SELECT is asserted.

The multi-pixel image decompression circuit 53 decompresses the compressed image data Comp_Data0 to Comp_Data47 to generate decompressed image data Dec_Data0 to Dec_Data95, and supplies the decompressed image data Dec_Data0 to Dec_Data95 to the parallel-serial conversion circuit 54. The multi-pixel image decompression circuit 53 is supplied with the clock signal HCK_IN, and the multi-pixel image decompression circuit 53 operates in synchronization with the clock signal HCK_IN. Further, the multi-pixel image decompression circuit 53 is supplied with a decompression select signal SELECT_EXT, and operates only when the decompression select signal SELECT_EXT is asserted. The decompression select signal SELECT_EXT is generated by delaying the select signal SELECT by a predetermined time (four clock cycles in this embodiment). With respect to the decompression processing performed in the multi-pixel image decompression circuit 53, a description thereof will be given in detail later.

The parallel-serial conversion circuit 54 generates 24-bit decompressed image data Ext_Data0 to Ext_Data23 by performing the parallel-serial conversion of a ratio of 4:1 on the decompressed image data Dec_Data0 to Dec_Data95, and outputs the decompressed image data Ext_Data0 to Ext_Data23 to the internal bus 24. The decompressed image data Ext_Data0 to Ext_Data23 are generated in synchronization with the clock signal HCK_IN. As described above, the decompressed image data Ext_Data0 to Ext_Data23 outputted to the internal bus 24 are transmitted to the data register section 25. The parallel-serial conversion circuit 54 is supplied with the decompression select signal SELECT_EXT, and the parallel-serial conversion circuit 54 is configured to operate only when the select signal SELECT_EXT is asserted.

The selector 55 selects the compressed image data IN_D0 to IN_D11 or data of all "0" in response to the decompression select signal SELECT_EXT, and outputs the selected data to the external bus 23. In detail, the selector 55 outputs the data of all "0" to the external bus 23 when the decompression select signal SELECT_EXT is asserted, and outputs the compressed image data IN_D0 to IN_D11 to the external bus 23 when the decompression select signal SELECT_EXT is negated.

The delaying circuit 56 generates the decompression select signal SELECT_EXT by delaying the select signal SELECT by the predetermined number of clock cycles. In this embodiment, the decompression select signal SELECT_EXT is generated by delaying the select signal SELECT by four clock cycles.

(Overall Operation of Data Drivers)

FIG. 11 is a timing chart showing an exemplary overall operation of the liquid crystal display device in the third embodiment. It should be noted that, although the operation of one data driver 8 (target data driver 8) is shown in FIG. 11, all data drivers 8 operate in the same manner.

First, a description is given of the transfer of the decompressed image data to the latch circuits $31_1$ to $31_4$ associated with the data lines X1 to X4. When the shift pulse signal STHR is asserted, the select signal SELECT is also asserted. In response to the assertion of the select signal SELECT, the serial-parallel conversion circuit 52 is selected by the switch 51 of the block decompression section 22A, and the compressed image data IN_D0 to IN_D11 associated with the pixels of one row and four columns connected to the data lines X1 to X4 are transmitted sequentially to the serial parallel conversion circuit 52. In FIG. 11, Comp_Data47-36 (1) indicates the higher 12 bits of the compressed image data IN_D0 to IN_D11 associated with the pixels of one row and four columns connected to the data lines X1 to X4, and Compt_Data35-24 (1) indicates the next higher 12 bits of the compressed image data, Compt_Data23-12 (1) indicates the next higher 12 bits of the compressed image data, and Compt_Data11-0 (1) indicates the lower 12 bits of the compressed image data.

The serial parallel conversion circuit 52 performs the serial-parallel conversion on the received compressed image data IN_D0 to IN_D11 to generate the compressed image data Comp_Data0 to Comp_Data47. In detail, four clock cycles after the assertion of the shift pulse signal STHR, the serial-parallel conversion circuit 52 supplies to the multi-pixel image decompression circuit 53 the compressed image data Comp_Data0 to Comp_Data47 associated with the pixels of one row and four columns connected to the data lines X1 to X4.

At the same time, the decompression select signal SELECT_EXT is asserted, and the multi-pixel image decompression circuit 53 decompresses the 48-bit compressed image data Comp_Data0 to Comp_Data47 to generate 96-bit decompressed image data Dec_Data0 to Dec_Data95. The higher 24 bits of the generated decompressed image data Dec_Data0 to Dec_Data95 are decompressed image data associated with the pixel connected to the data line X1, and the next higher 24 bits are decompressed image data associated with the pixel connected to the data line X2, and the next higher 24 bits are decompressed image data associated with the pixel connected to the data line X3, and the lowest 24 bits are decompressed image data corresponding to the pixel connected to the data line X4.

The decompressed image data Dec_Data0 to Dec_Data95 are subjected to the parallel-serial conversion by the parallel-serial conversion circuit 54, and as a result, the 24-bit decompressed image data Ext_Data0 to Ext_Data23 are generated. The parallel-serial conversion circuit 54 sequentially supplies the 24-bit decompressed image data Ext_Data0 to Ext_Data23 to the internal bus 24. In FIG. 11, Ext_Data (1) to Ext_Data (4) are the decompressed image data associated with the pixels connected to the data lines X1 to X4, respectively.

In parallel with the assertion of the decompression select signal SELECT_EXT, the latch signals SR1 to SR4 are sequentially asserted. In response to the assertion of the latch signals SR1 to SR4, the latch circuits $31_1$ to $31_4$ latches the decompressed image data Ext_Data (1) to Ext_Data (4), respectively.

The transfer of the decompressed image data to other latch circuits $31_5$ to $31n$ is performed also in the same procedure.

Here, the transfers of compressed image data Comp_Data47-36 ($i$), Comp_Data35-24 ($i$), Comp_Data23-12 ($i$) and Comp_Data11-0 ($i$) to the serial parallel conversion circuit 52 are performed in parallel with the transfers of decompressed image data Ext_Data ($4i$-3) to Ext_Data ($4i$) to the latch circuits $31_{4i}$-3 to $31_{4i}$, respectively, which are performed in response to the assertion of the latch SR ($4i$-3) to SR ($4i$).

When n clock cycles passes after the assertion of the start pulse signal STHR, the delaying shift register 21A asserts the shift pulse signal STHL. In response to the assertion of the shift pulse signal STHL, the shift pulse signal STHL fed to the data driver 8 adjacent on the right to the target data driver 8 is asserted, and the same operation as described above is performed in the data driver 8 adjacent on the right. When the clock signal HCK_IN is pulled down with the shift pulse signal STHL asserted, the select signal SELECT is negated.

In this embodiment, the negation of the decompression select signal SELECT_EXT is performed four clock cycles after the negation of the select signal SELECT, and the transfer of the decompressed image data Ext_Data(n−3) to Ext_Data(n) to the latch circuits $31_{n-3}$ to $31_n$ is performed after the negation of the select signal SELECT. When the transfer of decompressed image data Ext_Data (n−3) to Ext_Data (n) to the latch circuits $31_{n-3}$ to $31_n$ is completed, the decompression select signal SELECT_EXT is negated. Thereby, the transfer of the decompressed image data to latch circuits $31_1$ to $31_n$ in the target data driver 8 is completed.

Concurrently, the supply of the compressed image data associated with the data driver 8 adjacent on the right is started. In FIG. 11, the compressed image data associated with the data lines X($4i$-3) to X($4i$) of the data driver 8 adjacent on the right are denoted by Comp_Data47-36($n/4$+1), Comp_Data35-24($n/4$+i), Comp_Data23-12($n/4$+i) and Comp_Data11-0($n/4$+i). At this time, since the select signal SELECT is negated, the compressed image data Comp_Data47-36($n/4+_i$), comp_Data35-24($n/4$+i), Comp_Data23-12($n/4+_i$), and Comp_Data11-0($n/4$+i) are transferred as they are to the data driver 8 adjacent on the right through the external bus 23. With respect to other data drivers 8, the transfer of the decompressed image data to the latch circuits $31_1$ to $31_n$ is performed in the same procedure.

After the transfer of the decompressed image data to all the latch circuits $31_1$ to $31_n$ in all the data drivers 8 is completed, the driving of the data lines associated with the decompressed image data is performed in the next horizontal period of the horizontal period in which the decompressed image data are transferred.

In the liquid crystal display device 1 of the third embodiment, the image data transferred from the timing controller 6 to the leftmost data driver 8 and the image data transferred between the adjacent data drivers 8 are compressed as is the case of the first and second embodiments. Thereby, the effective data amount necessary for the transfer of the image data is reduced, and therefore, the number of interconnections on the glass substrate and/or the necessary data transfer rate can be reduced.

(Compression/Decompression)

1. Outline of Compression/Decompression and Circuit Configuration

Hereinafter, a description is given of the configuration of the multi-pixel image compression circuit 42 of the compression section 6a of the timing controller 6, the configuration of the multi-pixel image decompression circuit 53 of the block decompression section 22A of the data driver 8, and the compression/decompression processing performed in these circuits in the third embodiment.

In this embodiment, the multi-pixel image compression circuit 42 compresses the received image data 3 by selected one of the following five compression methods:

Lossless compression
(1×4) pixel compression
(2+1×2) pixel compression
(2×2) pixel compression
(4×1) pixel compression The lossless compression is a method of compressing original image data so as to be completely restorable from the compressed image data. In this embodiment, the lossless compression is used in a case where the image data of a target block has a specific pattern. The target block is a block which is the target of the compression processing. It should be noted that, as described above, each block is comprised of the pixels arrayed in one row and four columns in this embodiment. The (1×4) pixel compression is a method in which the processing of reducing the number of bit planes (dithering processing using a dither matrix in this embodiment) is independently performed for each of the four pixels of the target block. The (1×4) pixel compression is suitable for a case where the correlation of image data of the four pixels is low. The (2+1×2) pixel compression is a method in which representative values representing image data of two pixels out of the four pixels of the target block are calculated, whereas the processing of reducing the number of bit planes is performed for each of the other two pixels. The (2+1×2) pixel compression is suitable for a case where the correlation of image data of two pixels out of the four pixels is high, and the correlation of the image data of the other two pixels is low. The (2×2) pixel compression is a method in which four pixels of the target block is classified into two pairs each composed of two pixels, and representative values for representing the image data for each pair are calculated to thereby compress the image data. The (2×2) pixel compression is suitable for a case where the correlation of image data of two pixels out of four pixels is high, and moreover, the correlation of the image data of the other two pixels is also high. The (4×1) pixel compression is a method in which representative values for representing the imaged data of the four pixels of the target block are calculated to thereby compress the image data. The (4×1) pixel compression is suitable for a case where the correlation among the image data of the four pixels of the target block is high. The detail of these five compression method will be described in detail later.

One advantage of selecting the compression methods in this manner is that image compression which reduces block noise and granular noise is achieved. The compression method of this embodiment supports the compression method for calculating representative values corresponding to the image data of all pixels of the target block ((4×1) pixel compression in this embodiment), and the compression method for calculating representative values corresponding to the image data of some but not all of pixels of the target block ((2+1×2) pixel compression and (2×2) pixel compression in this embodiment), in addition to the compression method which performs independently the processing of reducing the number of bit planes for each of the four pixels of the target block ((1×4) compression method in this embodiment). This is effective for reducing the block noise and the granular noise. When the compression method for independently performing the processing of reducing the number of bit planes is performed for image data of pixels having a high correlation, granular noise is generated. On the other hand, when block coding is performed for the image data of pixels having a low correlation, block noise is generated. The compression method of this embodiment, which supports the compression method for calculating the representative values corresponding to the image data of some but not all of pixels of the target block, can avoid situations in which the processing of reducing the number of bit planes is performed for image data of pixels having high correlation or block coding is performed for image data of pixels having low correlation. This effectively reduces the block noise and the granular noise.

In addition, a capability of performing the lossless compression in a case where image data of the target block has a specific pattern is effective for appropriately performing an inspection of the LCD panel 2. In the inspection of the LCD panel 2, the brightness characteristics and color gamut characteristics are evaluated. In this evaluation, an image with a specific pattern is displayed on the LCD panel 2. At this time, it is necessary to display an image faithfully reproduced in color for the inputted image data on the LCD panel 2 in order to appropriately evaluate the brightness characteristics and color gamut characteristics; the brightness characteristics and color gamut characteristics cannot be appropriately evaluated if a compression distortion occurs. Hence, the multi-pixel image compression circuit 42 is configured to be adapted to the lossless compression in this embodiment.

The selection of the above-described five compression methods depends on whether the image data of the target block has the specific pattern and on the correlation between the image data of the four pixels within the target block. For example, the (4×1) pixel compression is used when the correlation of the image data of all four pixels is high, and the (2×2) pixel compression is used when the correlation of the image data of two pixels out of the four pixels is high, and the correlation of the image data of the other two pixels is high. The detail of the selection of the compression method will be described later.

Figure 12A:
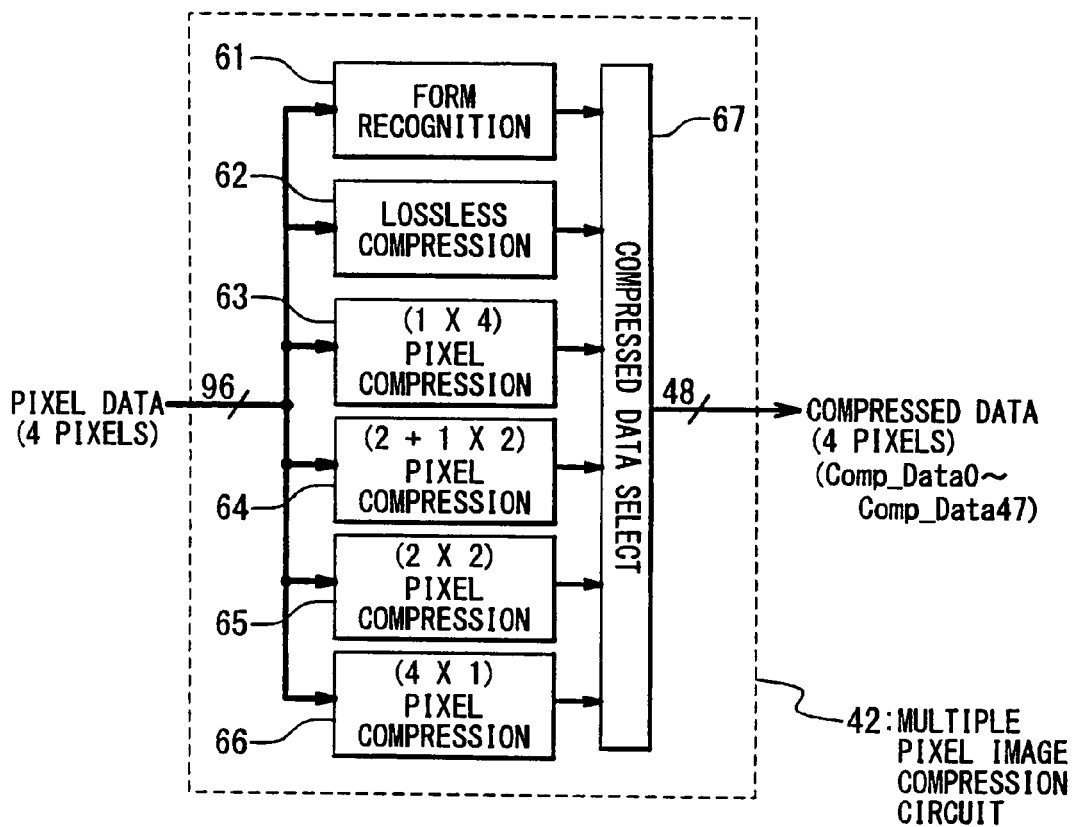
FIG. 12A is a block diagram showing an exemplary configuration of a multi-pixel image compression circuit in the third embodiment.

To perform the operation as described above, as shown in FIG. 12A, the multi-pixel image compression circuit 42 includes a form recognition section 61, a lossless compression section 62, a (1×4) pixel compression section 63, a (2+1×2) pixel compression section 64, a (2×2) pixel compression section 65, a (4×1) pixel compression section 66, and a compressed data selection section 67.

The form recognition section 61 receives the image data of the pixels arrayed in one row and four columns, and decides which one of the five compression methods should be selected. For example, the form recognition section 61 recognizes which combination of pixels has a high correlation in the image data or which pixel is low in correlation of the image data with respect to other pixels out of the pixels of one row and four columns. Further, the form recognition section 61 generates selection data for instructing which of the five compression method: the lossless compression, the (1×4) pixel compression, the (2+1×2) pixel compression, the (2×2) pixel compression, and the (4×1) pixel compression should be used in response to the result of the recognition.

The (1×4) pixel compression section 63, the (2+1×2) pixel compression section 64, the (2×2) pixel compression section 65, and the (4×1) pixel compression section 66 perform the above-described (1×4) pixel compression, (2+1×2) pixel compression, (2×2) pixel compression, and (4×1) pixel compression, respectively, and thereby generate (1×4) compressed data, (2+1×2) compressed data, (2×2) compressed data, and (4×1) compressed data, respectively.

The compressed data selection section 67 selects any of the (1×4) compressed data, the (2+1×2) compressed data, the (2×2) compressed data, and the (4×1) compressed data in response to the selection data received from the form recognition section 61, and outputs the selected data to the parallel-serial conversion circuit 43 as compressed image data Comp_Data0 to Comp_Data47. The compressed image data Comp_Data0 to Comp_Data47 include one or more compression type recognition bits indicating which one is used out of the five compression methods. As described above, the compressed image data Comp_Data0 to Comp_Data47 are subjected to the parallel-serial conversion by the parallel-serial conversion circuit 43 to generate the compressed image data IN_D0 to IN_D11, and the compressed image data IN_D0 to IN_D11 are supplied to the leftmost data driver 8.

Figure 12B:
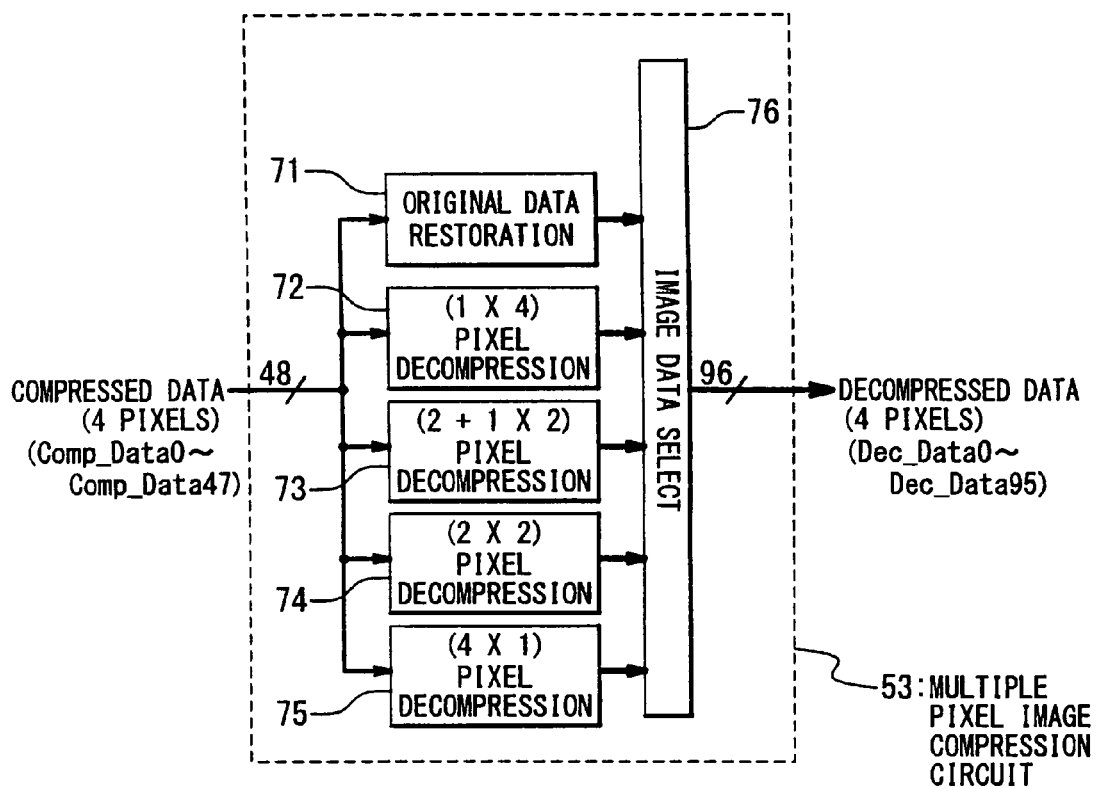
FIG. 12B is a block diagram showing an exemplary configuration of the multi-pixel image decompression circuit in the third embodiment.

On the other hand, the multi-pixel image decompression circuit 53 determines which one of the five compression methods is used to compress the compressed image data Comp_Data0 to Comp_Data47, and decompresses the compressed image data by the decompression method adapted to the used compressed method. To perform such an operation, as shown in FIG. 12B, the multi-pixel image decompression circuit 53 includes an original data restoration section 71, an (1×4) pixel decompression section 72, and a (2+1×2) pixel decompression section 73 as well as a (2×2) pixel decompression section 74, a (4×1) pixel decompression section 75, and the image data selection section 76. The original data restoration section 71, the (1×4) pixel decompression section 72, the (2+1×2) pixel decompression section 73, the (2×2) pixel decompression section 74, and the (4×1) pixel decompression section 75 decompress the compressed image data compressed by the lossless compression, the (1×4) pixel compression, the (2+1×2) pixel compression, the (2×2) pixel compression, and the (4×1) pixel compression, respectively. The image data selection section 76 recognizes the compression method actually used for the compression from the compression type recognition bit(s) contained in the compressed image data, and selects the decompressed image data generated by the decompression method corresponding to the compression method actually used, out of the decompressed image data outputted from the original data restoration section 71, the (1×4) pixel decompression section 72, the (2+1×2) pixel decompression section 73, the (2×2) pixel decompression section 74, and the (4×1) pixel decompression section 75; the selected decompressed imaged data are the above-mentioned 96-bit decompressed image data Dec_Data0 to Dec_Data95. As described above, the 96-bit decompressed image data Dec_Data0 to Dec_Data95 are subjected to the parallel-serial conversion by the parallel-serial conversion circuit 54, thereby generating the 24-bit decompressed image data Ext_Data0 to Ext_Data23, and the generated decompressed image data Ext_Data0 to Ext_Data23 are transferred to the latch circuits $31_1$ to $31_n$ of the data register section 25.

2. Selection of Compression Method

Figure 13:
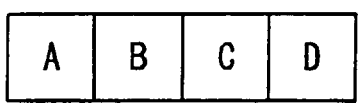
FIG. 13 is a conceptual illustration showing the configuration of a block, which is used as a unit of compression/decompression processing in the third embodiment.

In the following, a description is given of the operation of selecting the compression method to be actually used from the five compression methods. In the following description, as shown in FIG. 13, the leftmost pixel out of the pixels of one row and four columns will be referred to as pixel A, the second pixel from the left as pixel B, the second pixel from the right as pixel C, and the rightmost pixel as pixel D. Further, the grayscale values of the R sub-pixels of the pixels A, B, C, and D are denoted by $R_A$, $R_B$, $R_C$, and $R_D$, respectively, and the grayscale values of the G sub-pixels of the pixels A, B, C, and D are denoted by $G_A$, $G_B$, $G_C$, and $G_D$, respectively, and the grayscale values of the B sub-pixels of the pixels A, B, C, and D are denoted by $B_A$, $B_B$, $B_C$, and $B_D$, respectively.

FIG. 14 is a flowchart for showing an exemplary operation of selecting the actually-used compression method in the third embodiment. In the third embodiment, first, it is determined whether the image data of the four pixels of the target block are in accordance with any of specific patterns (Step S01); when the image data are in accordance with any of the specific patterns, the lossless compression is performed. In this embodiment, the specific patterns for which the lossless compression is to be performed are predetermined as those in which the number of the allowed data values of the image data of the pixels of the target block is five or less.

In detail, when the image data of the four pixels of the target block are in accordance with any of the following four patterns (1) to (4), the lossless compression is performed as follow:

(1) The grayscale values of the four pixels are the same of each color (FIG. 15A).

When the image data of the four pixels of the target block satisfy the following condition (1a), the lossless compression is performed:

$$R_A=R_B=R_c=R_D,$$

$$G_A=G_B=G_C=G_D, \text{ and}$$

$$B_A=B_B=B_C=B_D. \quad \text{Condition (1a)}$$

In this case, the number of allowed data values of the image data of the four pixels of the target block is three.

(2) The grayscale values of the R, G and B sub-pixels in each of the four pixels are the same (FIG. 15B).

The lossless compression is also performed, when the image data of the four pixels of the target block satisfy the following condition (2a):

$$R_A=G_A=B_A$$

$$R_B=G_B=B_B$$

$$R_C=G_C=B_C$$

$$R_D=G_D=B_D \quad \text{Condition (1b)}$$

In this case, the number of allowed data values of the image data of the four pixels of the target block is four.

(3) The grayscale values of two colors out of R, G, and B are the same with respect to the four pixels of the target block (FIGS. 15C to 15E).

The lossless compression is also performed, when any of the following three conditions (3a) to (3c) is satisfied, $$G_A=G_B=G_C=G_D=B_A=B_B=B_C=B_D. \quad \text{Condition (3a)}$$

$$B_A=B_B=B_C=B_D=R_A=R_B=R_C=R_D. \quad \text{Condition (3b)}$$

$$R_A=R_B=R_C=R_D=G_A=G_B=G_C=G_D. \quad \text{Condition (3c)}$$

In this case, the number of allowed data values of the image data of the four pixels of the target block is five.

(4) The grayscale values of one color out of R, G, and B are the same, and the grayscale values of the remaining two colors are the same with respect to the four pixels of the target block (FIGS. 15F to 15H).

Further, the lossless compression is also performed when any of the following three conditions (4a) to (4c) is satisfied:

$$G_A=G_B=G_C=G_D,$$

$$R_A=B_A,$$

$$R_B=B_B,$$

$$R_e=B_C, \text{ and}$$

$$R_D=B_D. \quad \text{Condition (4a)}$$

$B_A = B_B = B_C = E_D,$ $R_A = G_A,$ $R_B = G_B,$ $R_C = G_C,$ and $R_D = G_D.$  Condition (4b)

$R_A = R_s = R_C = R_D,$ $G_A = B_A,$ $G_B = B_B,$ $G_C = B_C,$ and $G_D = B_D.$  Condition (4c)

In this case, the number of allowed data values of the image data of the four pixels of the target block is five.

When the lossless compression is not performed, the compression method is selected according to the correlation among the image data of the four pixels. More specifically, the form recognition section 61 determines which of the following cases the image data of the four pixels of one row and four columns of the target block are in accordance with:

Case A:
The correlation is low for any combinations of the image data of the four pixels.

Case B:
A high correlation exists between the image data of two pixels, and the image data of the other two pixels have a low correlation with the preceding two pixels, and are mutually low in correlation.

Case C:
A high correlation exists between the image data of two pixels, and a high correlation exists between the image data of the other two pixels.

Case D:
A high correlation exists among the image data of the four pixels.

In detail, if the following condition (A) is not established for any combination of i, j satisfying:

$i \in \{A,B,C,D\},$ $j \in \{A,B,C,D\},$ and $i \neq j,$ the form recognition section 61 determines Case A is satisfied (that is, the correlation among the image data of the four pixels of the arbitrary combination out of the four pixels is low) (step S02).

$|Ri-Rj| \leq Th1,$ $|Gi-Gj| \leq Th1,$ and $\gamma|Bi-Bj| \leq Th1.$  Condition (A)

When Case A is satisfied, the form recognition section 61 decides that the (1×4) pixel compression is to be performed.

When determining that Case A is not satisfied, the form recognition section 61 defines a first set of two pixels and a second set of two pixels for the four pixels, and determines for all the allowed first and second sets whether a condition that the difference of the image data between the two pixels of the first set is smaller than the predetermined value, and the difference of the image data between the two pixels of the second set is smaller than the predetermined value is satisfied. More specifically, the form recognition section 61 determines whether any of the following conditions (B1) to (B3) is established (Step S03):

$|R_A-R_B| \leq Th2,$ $|G_A-G_B| \leq Th2,$ $|B_A-B_B| \leq Th2,$ $R_C-R_D| \leq Th2,$ $|G_C-G_D| \leq Th2,$ and $|B_C-E_D| \leq Th2.$  Condition (B)

$|R_A-R_C| \leq Th2,$ $|G_A-G_C| \leq Th2,$ $|B_A-B_C| \leq Th2,$ $|R_B-R_D| \leq Th2,$ $|G_B-G_D| \leq Th2,$ and $|B_B-B_D| \leq Th2.$  Condition (B2)

$|R_A-R_D| \leq Th2,$ $|G_A-G_D| \leq Th2,$ $|B_A-B_D| \leq Th2,$ $|R_B-R_C| \leq Th2,$ $|G_B-G_C| \leq Th2,$ and $|B_B-B_C| \leq Th2.$  Condition (B3)

When none of the above conditions (B1) to (B3) is established, the form recognition section 61 determines that Case B is satisfied (that is, a high correlation exists between the image data of the two pixels, and the image data of the other two pixels are mutually low in correlation). In this case, the form recognition section 61 decides that the (2+1×2) pixel compression is to be performed.

When determined that none of Cases A and B is not satisfied, the form recognition section 61 determines whether a condition that the difference between the maximum value and the minimum value of the image data of the four pixels with respect to all colors of the four pixels is smaller than a predetermined value is satisfied. More specifically, the form recognition section 61 determines whether the following condition (C) is established (Step S04).

$\max(R_A,R_D,R_C,R_D) - \min(R_A,R_B,R_C,R_D) < Th3,$ $\max(G_A,G_B,G_C,G_D) - \min(G_A,G_B,G_C,G_D) < Th3,$ and $\max(B_A,B_B,B_C,B_D) - \min(B_A,B_B,B_C,B_D) < Th3.$  Condition(C)

When the condition (C) is not established, the form recognition section 61 determines that Case C is satisfied (that is, a high correlation exits between the image data of the two pixels, and moreover, a high correlation exists between the image data of the other two pixels). In this case, the form recognition section 61 decides that the (2×2) pixel compression is to be performed.

On the other hand, when the condition (C) is not established, the form recognition section 61 determines that Case D is satisfied (that is, a high correlation exits among the image data of the four pixels). In this case, the form recognition section 61 decides that the (4×1) pixel compression is to be performed.

Based on the result of the recognition of the correlation, the form recognition section 61 generates the selection data for instructing which of the (1×4) pixel compression, the (2+1×2) pixel compression, the (2×2) pixel compression, and the (4×1) pixel compression should be used, and transmits the selection data to the compressed data selection section 67. As described above, the compressed data selection section 67 outputs the data selected out of the (1×4) compressed data, the (2+1×2) compressed data, the (2×2) compressed data, and the (4×1) compressed data as compressed image data Comp_Data0 to Comp_Data47, in response to the selection data transmitted from the form recognition section 61.

3. Details of Compression and Decompression

Subsequently, a description is given of the lossless compression, the (1×4) pixel compression, the (2+1×2) pixel compression, the (2×2) pixel compression, and the (4×1) pixel compression and the decompression methods for decompressing the compressed image data compressed by these compression methods.

3-1. Lossless Compression

In this embodiment, the lossless compression is performed by rearranging the data values of the image data of the pixels of the target block. FIG. 16 is a diagram showing the format of the lossless compressed data generated by the lossless compression. In this embodiment, the lossless compressed data are 48 bit data comprised of compression type recognition bits, color type data, image data #1 to #5, and padding data.

The compression type recognition bits are indicative of the type of the compression method used for the compression; four bits are allocated to the compression type recognition bits in the lossless compressed data. In this embodiment, the values of the compression type recognition bits of the lossless compressed data are "1111".

The color type data indicate the pattern which the image data of the four pixels of the target block are in accordance with, out of the patterns shown in FIGS. 15A to 15H. In this embodiment, the color type data are 3-bit data, since eight specific patterns are defined.

The image data #1 to #5 are data obtained by rearranging the data values of the image data of the pixels of the target block. The image data #1 to #5 are 8-bit data. As described above, the number of the allowed data values of the image data of the four pixels of the target block is five or less, and therefore, all the data values can be stored as the image data #1 to #5.

The padding data are added for making the number of bits of the lossless compressed data to be identical to the compressed image data compressed by other compression methods. In this embodiment, the padding data include one bit.

The decompression of the lossless compressed image data generated by the lossless compression is performed by rearranging the image data #1 to #5 referring to the color type data. The color type data indicates which of the patterns of FIGS. 15A to 15H the image data of the four pixels of the target block are in accordance with. Therefore, the original image data of the four pixels of the target block can be completely restored without causing any compression distortion by referring to the color type data. By driving the LCD panel 2 in response to the image data completely restored, the brightness characteristics and color gamut characteristics of the LCD panel 2 can be appropriately evaluated.

3-2. (1×4) Pixel Compression and Decompression Thereof

FIG. 17A is a conceptual illustration for explaining the (1×4) pixel compression, and FIG. 18 is a conceptual illustration showing the format of the (1×4) compressed data. As described above, the (1×4) pixel compression is a compression method used in a case where the correlation among the image data of the pixels is low for any combinations of the four pixels. In this embodiment, as shown in FIG. 18, the (1×4) compressed data are comprised of: a compression type recognition bit; $R_A$, $G_A$ and $B_A$ data corresponding to the image data of the pixel A; $R_B$, $G_B$ and $B_B$ data corresponding to the image data of the pixel B; $R_C$, $G_C$, and $B_C$ data corresponding to the image data of the pixel C; and $R_D$, $G_D$, and $B_D$ data corresponding to the image data of the pixel D. The (1×4) compressed data are 48 bit data. The compression type recognition bit is data indicating the compression method used for the compression, and in the (1×4) compressed data, one bit is allocated to the compression type recognition bit. In this embodiment, the value of the compression type recognition bit of the (1×4) compressed data is "0".

On the other hand, $R_A$, $G_A$ and $B_A$ data are bit-plane reduced data obtained by performing reduction of the number of the bit planes for the grayscale values of the R, G and B sub-pixels of the pixel A. The $R_B$, $G_B$ and $B_B$ data are bit-plane reduced data obtained by performing reduction of the number of bit planes for the grayscale values of the R, G, and B sub-pixels of the pixel B. $R_C$, $G_C$, and $B_C$ data are also bit-plane reduced data obtained by performing reduction of the number of the bit planes for the grayscale values of the R, G, and B sub-pixels of the pixel C. $R_D$, $G_D$, and $B_D$ data are bit-plane reduced data obtained by performing reduction of the number of the bit planes for the grayscale values of the R, G, and B sub-pixels of the pixel D. In this embodiment, only the $B_D$ data, which are associated with the B sub-pixel of the pixel D, are 3-bit data, and the other data are 4-bit data.

In the following, a description is given of the (1×4) pixel compression with reference to FIG. 17A. In the (1×4) pixel compression, dithering using a dither matrix is performed for each of the pixels A to D to thereby reduce the number of bit planes of the image data of the pixels A to D. In detail, error data α is first added to each of the image data of the pixel A, B, C, and D. In this embodiment, the error data α of each pixel is determined from the coordinates of the pixel of interest, by using a basic matrix which is a Bayer matrix. The calculation of the error data α will be described separately later. In the following, a description will be made assuming that the error data α defined for the pixels A, B, C and D are 0, 5, 10, and 15, respectively.

Further, rounding and bit truncation processing are performed, thereby generating the $R_A$, $G_A$ and $B_A$ data, the $R_B$, $G_B$ and $B_B$ data, the $R_C$, $G_C$ and $B_C$ data, and the $R_D$, $G_D$ and $B_D$ data. In detail, with respect to the grayscale value of the B sub-pixel of the pixel D, the lower five 5 bits is truncated after adding a value of 16. With respect to other grayscale values, truncation of the lower four bits is performed after adding a value of eight. The (1×4) compressed data is generated By attaching a value "0" as the compression type recognition bit to the $R_A$, $G_A$, and $B_A$ data, the $R_a$, $G_B$, and $B_B$ data, the $R_C$, $G_C$, and $B_C$ data, and the $R_D$, $G_D$, and $B_D$ data which are generated in the above-described manner.

FIG. 17B is a diagram showing the decompression method for the compressed image data compressed by the (1×4) pixel compression. In the decompression of the compressed image data compressed by the (1×4) pixel compression, first, the left bit shift is performed for the $R_A$, $G_A$, and $B_A$ data, the $R_B$, $G_B$, and $B_B$ data, the $R_C$, $G_C$, and $B_C$ data, and the $R_D$, $G_D$, and $B_D$ data. In detail, the $B_D$ data associated with to the B sub-pixel of the pixel D are subjected to 5-bit left shift, while the other data are subjected to 4-bit left shift.

Further, subtractions of the error data α are performed, and as a result, the image data of the pixels A to D (that is, the grayscale values of the R sub-pixel, the G sub-pixel, and the B sub-pixel) are reproduced. It would be understood that the original image data of the pixels A to D are approximately reproduced by the above-described decompression method, if the image data of the pixels A to D of the right column of FIG. 17B are compared with the image data of the pixels A to D of the left column of FIG. 17A.

3-3. (2+1×2) Pixel Compression

Figure 19A:
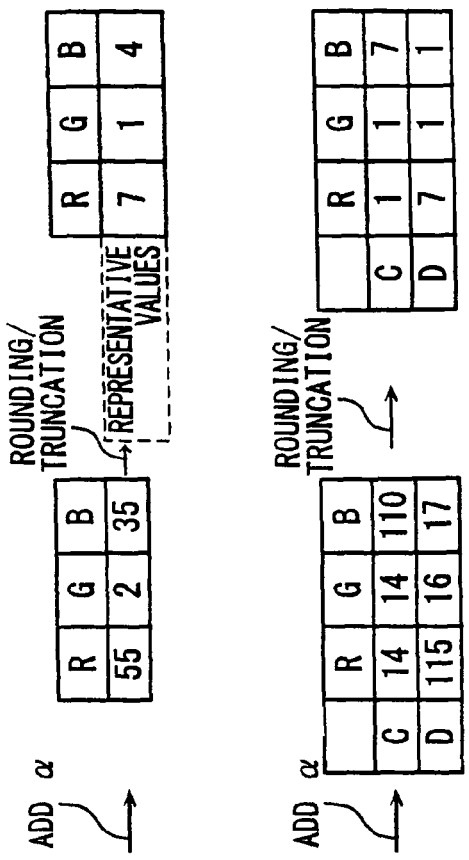
FIG. 19A is a conceptual illustration for explaining (2+1×2) pixel compression.

FIG. 19A is a conceptual illustration for explaining the (2+1×2) pixel compression, and FIG. 20A is a conceptual illustration showing the format of the (2+1×2) compressed data. As described above, the (2+1×2) pixel compression is adopted in a case where a high correction exists between the image data of two pixels, and the image data of the other two pixels have a low correlation with the preceding two pixels and are mutually low in correlation. As shown in FIG. 20A, in this embodiment, the (2+1×2) compressed data are comprised of compression type recognition bits, selection data, an R representative value, a G representative value, a B representative value, a large-small recognition data, a β comparison result data, Ri, Gi and Bi data, and Rj, Gj and Bj data. The (2+1×2) compressed data are 48 bits data similarly to the (1×4) compressed data.

The compression type recognition bits are indicative of the compression method used for the compression. In the (2+1×2) compressed data, two bits are allocated to the compression type recognition bits. In this embodiment, the value of the compression type recognition bits of the (2+1×2) compressed data is "10".

The selection data are 3-bit data indicating which two pixels out of the pixels A to D have a high correlation in the image data. When the (2+1×2) pixel compression is used, a high correlation exists between the image data of two pixels and the remaining two pixels have a low correlation in the image data with the other pixels out of the pixels A to D. Consequently, the number of allowed combinations of two pixels having a high correlation in the image data is six as follows:

Pixels A and C
Pixels B and D
Pixels A and B
Pixels C and D
Pixels B and C
Pixels A and D The selection data indicates with three bits which of these six combinations the two pixels having a high correlation in the image data belong to.

The R, G and B representative values are indicative of the grayscale values of the R sub-pixel, the G sub-pixel, and the B sub-pixel of the two pixels having the high correlation, respectively. In the example of FIG. 20A, the R representative value and the G representative value are 5- or 6-bit data, whereas the B representative value is 5-bit data.

The β comparison result data are indicative of whether or not the difference between the grayscale values of the R sub-pixels of the two pixels having the high correlation and the difference between the image data of the G sub-pixels of the two pixels having the high correlation are larger than the predetermined threshold value β. In this embodiment, the β comparison result data are 2-bit data. On the other hand, the large-small recognition data are indicative of which R sub-pixel of the two pixels having the high correlation has a larger grayscale value and which G sub-pixel of the two pixels having the high correlation has a larger grayscale value. The large-small recognition data corresponding to the R sub-pixel are generated only when the difference of the grayscale values of the R sub-pixels of the two pixels having a high correlation is larger than a threshold value β, and the large-small recognition data corresponding to the G sub-pixels are generated only when the difference of the grayscale values of the G sub-pixels of the two pixels having a high correlation is larger than the threshold value R. Consequently, the large-small recognition data are data of zero to two bits.

The Ri, Gi and Bi data and the Rj, Gj and Bj data are bit-plane reduced data obtained by performing reduction of the bit planes for the grayscale values of the R, G, and B sub-pixels of the two pixels having the low correlation. In this embodiment, all of the Ri, Gi, and Bi data and the Rj, Gj and Bj data are 0-bit data.

The (2+1×2) pixel compression will be described below referring to FIG. 19A. FIG. 19A shows the generation of the (2+1×2) compressed data in a case where the correlation between the image data of the pixels A and B is high, and the image data of the pixels C and D have the low correlation with respect to the image data of the pixels A and B, and moreover, the mutual correlation of the image data of the pixels C and D is low. It would be easily understood by those skilled in the art that the (2+1×2) compressed data may be generated similarly with respect to other cases.

First, a description is given of the compression processing of the image data of the pixels A and B (having the high correlation). First, the average values of the grayscale values are calculated with respect to the R sub-pixels, the G sub-pixels, and the B sub-pixels. The average values Rave, Gave, and Bave of the grayscale values of the R sub-pixels, G sub-pixels, and the B sub-pixels are calculated by the following formula:

$$Rave=(R_A+R_B+1)/2,$$

$$Gave=(G_A+G_B+1)/2, \text{ and}$$

$$Bave=(B_A+B_B+1)/2.$$

Further, a comparison is made as to whether or not the difference $|R_A-R_B|$ of the grayscale values of the R sub-pixels of the pixels A and B and the difference $|G_A-G_B|$ of the grayscale values of the G sub-pixels are larger than the predetermined threshold value β. The results of this comparison are described in the (2+1×2) compressed data as the β comparison result data.

Further, the large-small recognition data are prepared for the R sub-pixels and the G sub-pixels of the pixels A and B by the following procedure. When the difference $|R_A-R_B|$ of the grayscale values of the R sub-pixels of the pixels A and B is larger than the threshold value β, the large-small recognition data are generated to indicate which of the grayscale values of the R sub-pixels of the pixels A and B is larger. If the difference $|R_A-R_B|$ of the grayscale values of the R sub-pixels of the pixels A and B is not more than the threshold value β, the large-small recognition data are generated not to indicate which of the grayscale values of the R sub-pixels of the pixels A and B is larger. Similarly, when the difference $|G_A-G_B|$ of the grayscale values of the G sub-pixels of the pixels A and B is larger than the threshold value β, the large-small recognition data are generated to indicate which of the grayscale values of the G sub-pixels of which pixels A and B is larger. If the difference $|G_A-G_B|$ of the grayscale values of the G sub-pixels of the pixels A and B is not more than the threshold value β, the large-small recognition data are generated not to indicate which of the grayscale values of the G sub-pixels of the pixels A and B is larger.

In the example of FIG. 19A, the grayscale values of the R sub-pixels of the pixels A and B are 50 and 59, and the threshold value β is 4, respectively. In this case, since the grayscale value difference $|R_A-R_B|$ is larger than the threshold value β, this fact is described in the β comparison result data, and the fact that the grayscale value of the R sub-pixel of the pixel B is larger than the grayscale value of the R sub-pixel of the pixel A is described in the large-small recognition data. On the other hand, the grayscale values of the G sub-pixels of the pixels A and B are 2 and 1, respectively. Since the grayscale value difference $|G_A-G_B|$ is not more than the threshold value β, this fact is described in the β comparison result data. The large-small recognition data are not generated to indicate which of the grayscale values of the G sub-pixels of the pixels A and B is larger. As a result, in the example of FIG. 19A, the large-small recognition data are one-bit data.

Subsequently, error data α are added to the respectively average values Rave, Gave and Bave of the grayscale values of the R, G and B sub-pixels. In this embodiment, the error data α is decided from the coordinates of the two pixels of the relevant combination by using the basic matrix. The calculation of the error data α will be described in detail later. In this embodiment, a description is given below assuming that the error data α defined for the pixels A and B are 0.

Further, rounding and bit truncation processing are performed, thereby calculating the R, G and B representative values. In detail, numerical values added in the rounding for the R sub-pixel and the G sub-pixels and the number of bits truncated in the bit truncation processing are decided in accordance with the relation of the grayscale value differences $|R_A-R_B|$ and $|G_A-G_B|$ with the threshold value R. With respect to the R sub-pixels, when the grayscale value difference $|R_A-R_B|$ of the R sub-pixels is larger than the threshold value β, the truncation of the lower three bits is performed on the average value Rave of the grayscale values of the R sub-pixels after a value of "4" is added to the average value Rave, thereby calculating the R representative value. Otherwise, the truncation of the lower two bits is performed on the average value Rave of the grayscale values of the R sub-pixels after a value of "2" is added to the average value Rave, thereby calculating the R representative value. The same goes for the G sub-pixels; when the difference $|G_A-G_B|$ of the grayscale values is larger than the threshold value β, truncation of lower three bits is performed on the average value Gave of the grayscale values of the G sub-pixels after a value of "4" is added to the average values Gave, thereby calculating the G representative value. Otherwise, truncation of lower two bits is performed on the average values Gave after a value of "2" is added to the average values Gave, thereby calculating the G representative value. In the example of FIG. 19A, the truncation of lower three bits is performed on the average value Rave of the R sub-pixels after addition of a value of "4", and the truncation of lower two bits is performed on the average value Gave of the G sub-pixels after addition of a value of "2".

With respect to the B sub-pixels, on the other hand, truncation of lower three bits is performed on the average value Bave of the grayscale values of the B sub-pixels after addition of a value of "4", thereby calculating the B representative value. By the processing as described above, the compression processing of the image data of the pixels A and B is completed.

With respect to the image data of the pixels C and D (which have the low correlation), the same processing as the (1×4) pixel compression is performed. That is, the dithering processing using a dither matrix is independently performed with respect to each of the pixels C and D, thereby reducing the number of bit planes of the image data of the pixels C and D. In particular, the error data α is first added to each of the image data of the pixels C and D. As described above, the error data α of each pixel is calculated from the coordinates of the pixel of interest. In the following, a description will be made assuming that the error data α defined for the pixels C and D are 10 and 15, respectively.

Further, rounding and bit truncation processing are performed, thereby generating the $R_C$, $G_C$, and $B_C$ data, and the $R_D$, $G_D$, and $B_D$ data. In particular, truncation of lower four bits is performed on each of the grayscale values of the R, G, and B sub-pixels of each of the pixels C and D after a value of "8" is added to each of the grayscale values of the R, G, and B sub-pixels, thereby calculating the $R_C$, $G_C$, and $B_C$ data, and the $R_D$, $G_D$, and $B_D$ data.

The (2+1×2) compressed data are generated by attaching the compression type recognition bits and the selection data to the R, G and B representative values, the large-small recognition data, the β comparison result data, the $R_C$, $G_C$, and $B_C$ data, and the $R_D$, $G_D$, and $B_D$ data.

Figure 19B:
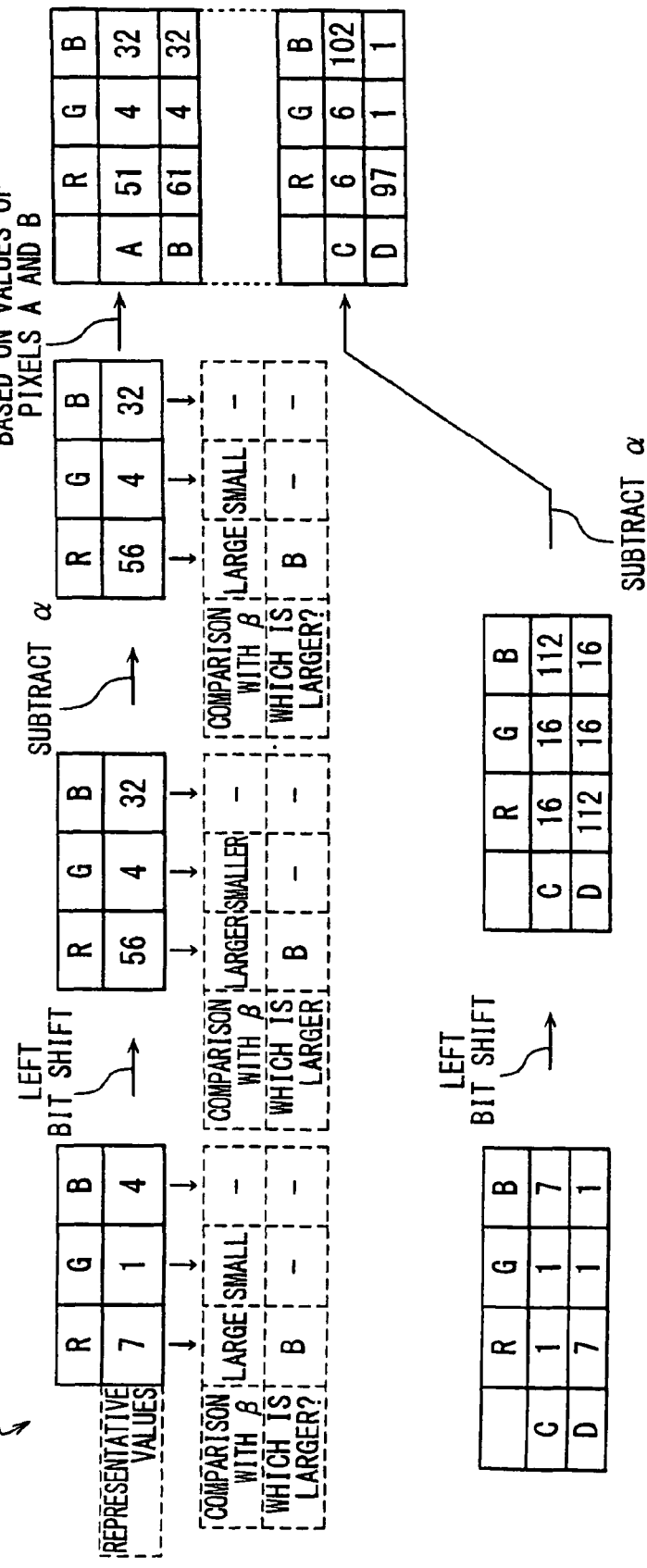
FIG. 19B is a conceptual illustration for explaining a decompression method of the compressed image data compressed by the (2+1×2) pixel compression.

FIG. 19B is diagram showing the decompression method of the compressed image data compressed by the (2+1×2) pixel compression. FIG. 19B shows the decompression of the (2+1×2) compressed data in a case where the correlation between the image data of the pixels A and B is high, the image data of the pixels C and D have the low correlation for the image data of the pixels A and B, and the correlation of the image data between the pixels C and D is low. It would be easily appreciated by those skilled in the art that the (2+1×2) compressed data can be decompressed in the same way for other cases.

First, a description is given of the decompression processing concerning the image data of the pixels A and B (having a high correlation). First, left bit shifts are performed for the R, G and B representative values, respectively. The number of bits of the left bit shifts for the R and G representative values is decided in accordance with the relation of the differences $|R_A-R_B|$ and $|G_A-G_B|$ of the grayscale values with the threshold value β described in the β comparison result data. When the grayscale value difference $|R_A-R_B|$ of the R sub-pixels is larger than the threshold value β, the left bit shift of three bits is performed for the R representative value, and otherwise, the left bit shift of two bits is performed. Similarly, when the grayscale value difference $|G_A-G_B|$ of the G sub-pixels is larger than the threshold value β, the left bit shift of three bits is performed for the G representative value, and otherwise, the left bit shift of two bits is performed. In the example of FIG. 19B, the left bit shift of three bits is performed for the R representative value, and the left bit shift of two bits is performed for the G representative value. On the other hand, the left bit shift of three bits is performed for the B representative value.

Further, the error data α are subtracted from the R, G and B representative values, respectively, to thereby reproduce the grayscale values of the R, G and B sub-pixels of the pixels A and B from the R, G and B representative values.

In the reproduction of the grayscale values of the R sub-pixels of the pixels A and B, the β comparison result data and the large-small recognition data are used. When the β comparison result data describe that the difference $|R_A-R_B|$ of the grayscale values of the R sub-pixels is larger than the threshold value β, a value obtained by adding a value of "5" to the R representative value is reproduced as the grayscale value of the R sub-pixel which is described as being larger in the large-small recognition data out of the R sub-pixels of the pixels A and B, and a value obtained by subtracting a value of "5" from the R representative value is restored as the grayscale value of the R sub-pixel which is described as being smaller in the large-small recognition data. On the other hand, when the difference $|R_A-R_B|$ of the grayscale values of the R sub-pixels is smaller than the threshold value $\beta$, the grayscale values of the R sub-pixels of the pixels A and B are reproduced as being identical to the R representative value. In the example of FIG. 19B, the grayscale value of the R sub-pixel of the pixel A is reproduced as the value obtained by a value of "5" from the R representative value, and the grayscale value of the R sub-pixel of the pixel B is reproduced as the value obtained by adding a value of "5" to the R representative value.

The same processing is performed by using the $\beta$ comparison result data and the large-small recognition data for the reproduction of the grayscale values of the G sub-pixels of the pixels A and B. In the example of FIG. 19B, the values of the G sub-pixels of the pixels A and B are reproduced as being identical to the G representative value.

In the restoration of the grayscale values of the B sub-pixels of the pixels A and B, on the other hand, the values of the B sub-pixels of the pixels A and B are reproduced as being identical to the B representative value, irrespective of the $\beta$ comparison result data and the large-small recognition data.

Thus, the reproduction of the grayscale values of the R sub-pixels, the G sub-pixels, and the B sub-pixels of the pixels A and B is completed.

In the decompression processing regarding the image data of the pixels C and D (having a low correlation), the same processing as the decompression processing of the (1×4) compressed data is performed. In the decompression processing regarding the image data of the pixels C and D, the left bit shift of four bits is first performed for each of the $R_C$, $G_C$, and $B_C$ data, and the $R_D$, $G_D$, and $B_D$ data. Further, the subtraction of error data $\alpha$ is performed, and as a result, the image data (that is, the grayscale values of the R sub-pixel, the G sub-pixel, and the B sub-pixel) of the pixels C and D are reproduced. Thus, the reproduction of the grayscale values of the R sub-pixels, the G sub-pixels, and the B sub-pixels of the pixels C and D is completed.

If the image data of the pixels A to D of the right column of FIG. 19B with the image data of the pixels A to D of the left column of FIG. 19A are compared, it will be understood that the original image data of the pixels A to D are approximately reproduced by the above-described decompression method.

As a modification of the compression/decompression processing of FIGS. 19A and 19B, the number of bits allocated to the representative value may be increased with respect to a specific combination of pixels; the selection data are given three bits, while there are six combinations of the two pixels having the high correlation of the image data. Let us consider the case, for example, that selection data are defined as follows (x is an arbitrary symbol of "0" and "1"):
Combination of Pixels A and B: 00x
Combination of Pixels A and C: 010
Combination of Pixels A and D: 011
Combination of Pixels B and C: 100
Combination of Pixels B and D: 101
Combination of Pixels C and D: 11x In this case, the number of bits allocated to any one of the R representative value, the G representative value, and the B representative value may be increased by one bit with the number of bits given to the selection date determined as two bits, when two pixels having a high correlation in the image data are the pixels A and B and the pixels C and D.

FIG. 20B is a diagram showing the format of the (2+1×2) compressed data in a case where the two pixels having the high correlation of the image data are either the pixels A and B or the pixels C and D, and the number of bits given to the G representative value is increased by one bit. In the format of FIG. 20B, two bits are allocated to the selection data, and six or seven bits are allocated to the G representative value in accordance with the relation with the grayscale value difference $|G_A-G_B|$ with the threshold value $\beta$. By increasing the number of bits allocated to the G representative value, the information amount is increased to reduce the compressive strain. In this case, the left bit shift of one bit or two bits is performed for the G representative value in the decompression processing. The number of bits of the left bit shift is decided in accordance with the relation with the grayscale value difference $|G_A-G_B|$ with the threshold value $\beta$.

3-4. (2×2) Pixel Compression

FIG. 21A is a conceptual illustration for explaining the (2×2) pixel compression, and FIG. 22A is a conceptual illustration showing the format of the compressed data generated by the (2×2) pixel compression. As described above, the (2×2) pixel compression is used in a case where a high correlation exists between the image data of the two pixels, and a high correlation exists between the image data of the other two pixels. In this embodiment, as shown in FIG. 22A, the (2×2) compressed data are 48 bits data composed of compression type recognition bits, selection data, a R representative value #1, a G representative value #1, a B representative value #1, a R representative value #2, a G representative value #2, a B representative value #2, a large-small recognition data, and $\beta$ comparison result data.

The compression type recognition bits indicate the compression method used for the compression, and in the (2×2) compressed data, three bits are allocated to the compression type recognition bits. In this embodiment, the value of the Compression type recognition bits of the (2×2) compressed data is "110".

The selection data are two bit data indicating which two pixels out of the pixels A to D have a high correlation between the image data. When the (2×2) pixel compression is used, a high correlation exists between the image data of the two pixels, and a high correlation exists between the image data of the other two pixels out of the pixels A to D. Consequently, the allowed combinations of two pixels having a high correlation of the image data are the following three combinations:
Correlation between pixels A and B is high, and correlation between pixels C and D is high,
Correlation between pixels A and C is high, and correlation between pixels B and D is high,
Correlation between pixels A and D is high, and correction between pixels B and C is high.

The selection data indicate by two bits which combination is the case out of these three combinations.

The R representative value #1, the G representative value #1, and the B representative value #1 represent the grayscale values of the R sup-pixels, the G sub-pixels, and the B sub-pixels of one set of two pixels, respectively, and the R representative value #2, the G representative value #2, and the B representative value #2 represent the grayscale values of the R sup-pixels, the G sub-pixels, and the B sub-pixels of the other set of two pixels, respectively. In the example of FIG. 22A, the R representative value #1, G representative value #1, the B representative value #1, the R representative value #2, and the B representative value #2 are 5-bit or 6-bit data, and the G representative value #2 are 6-bit or 7-bit data.

The $\beta$ comparison result data indicate whether the difference of the grayscale values of the R sub-pixels of the two pixels having a high correlation, the difference of the image data of the G sub-pixels of the two pixels having a high correlation, and the difference of the image data of the B sub-pixels of the two pixels are larger than the predetermined threshold value β. In this embodiment, the β comparison result data are 6-bit data in which three bits are allocated to each pair of two pixels, respectively. On the other hand, the large-small recognition data indicate which of the R sub-pixels of the two pixels having a high correlation has a larger grayscale value and which of the G sub-pixels of the two pixels having a high correlation has a larger grayscale value. The large-small recognition data associated with the R sub-pixels are generated only when the difference of the grayscale values of the R-sub-pixels of the two pixels having a high correlation is larger than the threshold value β, and the large-small recognition data associated with the G sub-pixels are generated only when the difference of the grayscale values of the G sub-pixels of the two pixels having a high correlation is larger than the threshold value β, and the large-small recognition data associated with the B sub-sub-pixels are generated only when the difference of the grayscale values of the B sub-pixels of the two pixels having a high correlation is larger than the threshold value β. Consequently, the large-small recognition data are 0-bit to 6-bit data.

Hereinafter, a description is given of the (2×2) pixel compression, referring to FIG. 21A. FIG. 21A shows the generation of the (2×2) compressed data in a case where the correlation between the image data of the pixels A and B is high and the correlation between the image data of the pixels C and D is high. It would be easily understood by the skilled person that the (2×2) compressed data can be generated similarly for other cases.

First, the average values of the grayscale values are calculated with respect to the R sub-pixel, the G sub-pixel, and the B sub-pixel, respectively. The average values Rave1, Gave1, and Bave1 of the grayscale values of the R sub-pixel, G sub-pixel, and the B sub-pixel of the pixels A and B, and the average values Rave2, Gave2, and Bave2 of the grayscale values of the R sub-pixel, G sub-pixel, and the B sub-pixel of the pixels C and D are calculated by the following formula:

$Rave1 = (R_A + R_B + 1)/2$, $Gave1 = (G_A + G_B + 1)/2$, $Bave1 = (B_A + B_B + 1)/2$, $Rave2 = (R_A + R_B + 1)/2$, $Gave2 = (G_A + G_B + 1)/2$, $Bave1 = (B_A + B_B + 1)/2$.

Further, comparisons are made as to whether the difference $|R_A - R_B|$ of the grayscale values of the R sub-pixels, the difference $|G_A - G_B|$ of the grayscale values of the G sub-pixels, and the difference $|B_A - B_B|$ of the grayscale values of the B sub-pixels of the pixels A and B are larger than the predetermined threshold value β. Similarly, comparisons are made as to whether the difference $|R_C - R_D|$ of the grayscale values of the R sub-pixels, the difference $|G_C - G_D|$ of the grayscale values of the G sub-pixels, and the difference $|B_C - B_D|$ of the grayscale values of the B sub-pixels of the pixels C and D are larger than the predetermined threshold value β. The results of these comparisons are described in the (2×2) compressed data as the β comparison result data.

Further, the large-small recognition data are prepared for the combination of the pixels A and B and the combination of the pixels C and D, respectively. In detail, the large-small recognition data are generated to describe which of the R sub-pixels of the pixels A and B has a larger grayscale value, when the difference $|R_A - R_B|$ of the grayscale values of the R sub-pixels of the pixels A and B is larger than the threshold value β. When the difference $|R_A - R_B|$ of the grayscale values of the R sub-pixels of the pixels A and B is not more than the threshold value β, the relation of the grayscale values of the R sub-pixels of the pixels A and B is not described in the large-small recognition data. Similarly, the large-small recognition data are generated to describe which of the G sub-pixels of the pixels A and B has a larger grayscale value, when the difference $|G_A - G_B|$ of the grayscale values of the G sub-pixels of the pixels A and B is larger than the threshold value β. When the difference $|G_A - G_B|$ of the grayscale values of the G sub-pixels of the pixels A and B is not more than the threshold value β, the relation of the grayscale values of the G sub-pixels of the pixels A and B is not described in the large-small recognition data. In addition, the large-small recognition data are generated to describe which of the B sub-pixels of the pixels A and B has a larger grayscale value, when the difference $|B_A - B_B|$ of the grayscale values of the B sub-pixels of the pixels A and B is larger than the threshold value β. When the difference $|B_A - B_B|$ of the grayscale values of the B sub-pixels of the pixels A and B is not more than the threshold value β, the size relation of the grayscale values of the B sub-pixels of the pixels A and B is not described in the large-small recognition data.

Similarly, the large-small recognition data are generated to describe which of the R sub-pixels of the pixels C and D has a larger grayscale value, when the difference $|R_C - R_D|$ of the grayscale values of the R sub-pixels of the pixels C and D is larger than the threshold value β. When the difference $|R_C - R_D|$ of the grayscale values of the R sub-pixels of the pixels C and D is not more than the threshold value β, the relation of the grayscale values of the R sub-pixels of the pixels C and D is not described in the large-small recognition data. Similarly, the large-small recognition data are generated to describe which of the G sub-pixels of the pixels C and D has a larger grayscale value, when the difference $|G_C - G_D|$ of the grayscale values of the G sub-pixels of the pixels C and D is larger than the threshold value β. When the difference $|G_C - G_D|$ of the grayscale values of the G sub-pixels of the pixels C and D is not more than the threshold value β, the relation of the grayscale values of the G sub-pixels of the pixels C and D is not described in the large-small recognition data. In addition, the large-small recognition data are generated to describe which of the B sub-pixels of the pixels C and D has a larger grayscale value, when the difference $|B_C - B_D|$ of the grayscale values of the B sub-pixels of the pixels C and D is larger than the threshold value β. When the difference $|B_C - B_D|$ of the grayscale values of the B sub-pixels of the pixels C and D is not more than the threshold value β, the size relation of the grayscale values of the B sub-pixels of the pixels C and D is not described in the large-small recognition data.

In the example of FIG. 21A, the grayscale values of the R sub-pixels of the pixels A and B are 50 and 59, and the threshold values p thereof are 4, respectively. In this case, since the difference $|R_A - R_B|$ of the grayscale values is larger than the threshold value β, this fact is described in the β comparison result data, and the fact that the grayscale value of the R sub-pixel of the pixel B is larger than the grayscale value of the R sub-pixel of the pixel A is described in the large-small recognition data. On the other hand, the grayscale values of the G sub-pixels of the pixels A and B are 2 and 1, respectively. In this case, since the difference $|G_A - G_B|$ of the grayscale values is not more than the threshold value β, this fact is described in the β comparison result data. The relation of the grayscale values of the G sub-pixels of the pixels A and B is not described in the large-small recognition data. Further, the grayscale values of the B sub-pixels of the pixels A and B are 30 and 39, respectively. In this case, since the difference $|B_A-B_B|$ of the grayscale values is larger than the threshold value β, this fact is described in the β comparison result data, and the fact that the grayscale value of the B sub-pixel of the pixel B is larger than the grayscale value of the B sub-pixel of the pixel A is described in the large-small recognition data.

Further, the grayscale values of the R sub-pixels of the pixels C and D are 100, respectively. In this case, since the difference $|R_C-R_D|$ of the grayscale values is not more than the threshold value β, this fact is described in the β comparison result data. The relation of the grayscale values of the G sub-pixels of the pixels A and B is not described in the large-small recognition data. Further, the grayscale values of the G sub-pixels of the pixels C and D are 80 and 85, respectively. In this case, since the difference $|G_A-G_B|$ of the grayscale values is larger than the threshold value β, this fact is described in the β comparison result data. Further, the fact that the grayscale value of the G sub-pixel of the pixel D is larger than the grayscale value of the G sub-pixel of the pixel C is described in the large-small recognition data. Further, the grayscale values of the B sub-pixels of the pixels C and D are 8 and 2, respectively. In this case, since the difference $|B_C-B_B|$ of the grayscale values is larger than the threshold value β, this fact is described in the β comparison result data. Further, the fact that the grayscale value of the B sub-pixel of the pixel C is larger than the grayscale value of the B sup-pixel of the pixel D is described in the large-small recognition data.

Further, error data α are added to the average values Rave1, Gave1, and Bave1 of the grayscale values of the R sub-pixels, G sub-pixels, and the B sub-pixels of the pixels A and B, and the average values Rave2, Gave2, and Bave2 of the grayscale values of the R sub-pixels, G sub-pixels, and the B sub-pixels of the pixels C and D. In this embodiment, the error data α are determined by using a basic matrix which is a Bayer matrix from the coordinates of the two pixels of each combination. The calculation of the error data α will be described separately later. In this embodiment, a description is given below assuming that the error data α defined for the pixels A and B are 0.

This is followed by rounding and bit truncation processing, thereby calculating the R representative value #1, the G representative value #1, the B representative value #1, the R representative value #2, the G representative value #2, and the B representative value #2. For the pixels A and B, the numerical value to be added and the number of bits to be truncated in the rounding and bit truncation processing are decided to be data of two or three bits in accordance with the relation between the differences $|R_A-R_B|$, $|G_A-G_B|$, and $|B_A-B_B|$ of the grayscale values and the threshold value β. With respect to the R sub-pixels, the R representative value #1 is calculated by truncating the lower three bits after adding a value of "4" to the average value Rave1 of the grayscale values of the R sub-pixels, when the difference $|R_A-R_B|$ of the grayscale values of the R sub-pixels is larger than the threshold value β. Otherwise, the R representative value #1 is calculated by truncating the lower two bits after adding a value of "2" to the average value Rave1. As a result, the R representative value #1 is calculated as 5-bit or 6-bit data. The same goes for the G sup-pixels and the B sub-pixels. The G representative value #1 is calculated by truncating lower three bits after adding a value of "4" to the average value Gave1 of the grayscale values of the G sub-pixels, when the difference $|G_A-G_B|$ of the grayscale values is larger than the threshold value R. Otherwise, the G representative value #1 is calculated by truncating the lower two bits after adding a value of "2" to the average value Gave1. Further, the B representative value #1 is calculated by truncating the lower three bits after adding a value of "4" to the average value Bave1 of the grayscale values of the B sub-pixels, when the difference $|B_A-B_B|$ of the grayscale values is larger than the threshold value β. Otherwise, the B representative value #1 is calculated by truncating the lower two bits after adding a value of "2" to the average value Bave1.

In the example of FIG. 21A, the R representative value #1 is calculated by truncating the lower three bits after adding a value of "4" to the average value Rave1 of the R sub-pixels of the pixels A and B. Further, the G representative value #1 is calculated by truncating the lower two bits after adding a value of "2" to the average value Gave1 of the G sub-pixels of the pixels A and B. Further, the B representative value #1 is calculated by truncating the lower three bits after adding a value of "4" to the average value Bave1 of the grayscale values of the B sub-pixels of the pixels A and B.

The same processing is also performed for the combination of the pixels C and D, thereby calculating the R representative value #2, the G representative value #2, and the B representative value #2. It should be noted, however, that the numerical value added in the rounding processing and the number of bits truncated in the bit truncation processing are one bit or two bits, with respect to the G sub-pixels of the pixels C and D. When the difference $|G_C-G_D|$ of the grayscale values is larger than the threshold value β, the G representative value #2 is calculated by truncating the lower two bits after adding a value of "2" to the average value Gave2 of the grayscale values of the G sub-pixels. Otherwise, the G representative value #2 is calculated by truncating the lower one bit after adding a value of "1" to the average value Gave2.

In the example of FIG. 21A, the R representative value #2 is calculated by truncating the lower two bits after adding a value of "2" to the average value Rave 2 of the R sub-pixels of the pixels C and D. Further, the G representative value #2 is calculated by truncating the lower three bits after adding a value of "4" to the average value Gave2 of the G sub-pixels of the pixels C and D. Further, with respect to the B sub-pixels of the pixels C and D, the B representative value #2 is calculated by truncating the lower three bits after adding a value of "4" to the average value Bave2 of the grayscale values of the B sub-pixels.

The compression processing by the (2×2) pixel compression is completed by the above-described processing.

Figure 21B:
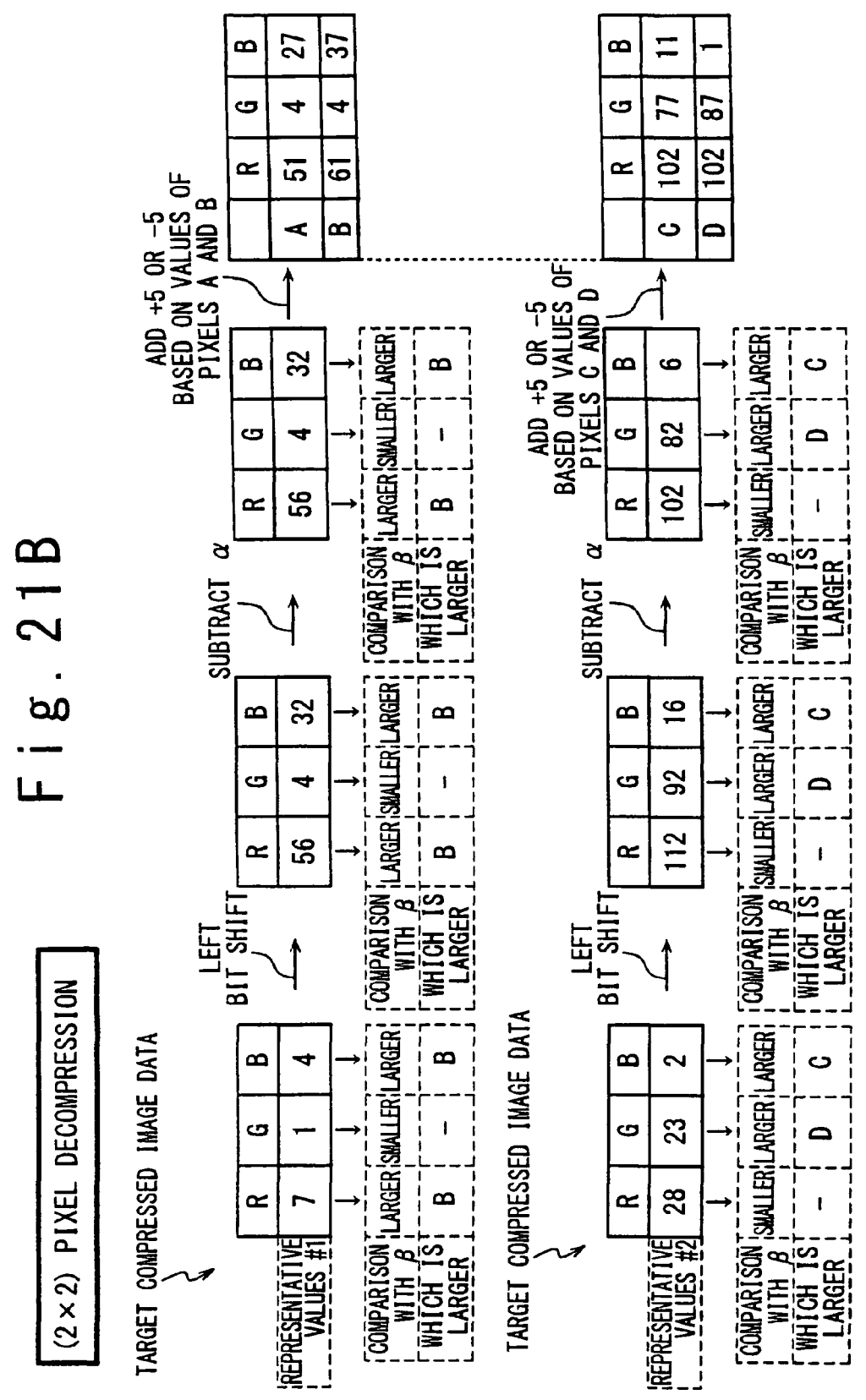

On the other hand, FIG. 21B is a diagram showing the decompression method of the compressed image data compressed by the (2×2) pixel compression. FIG. 21B shows the decompression of the compressed data compressed by the (2×2) pixel compression in a case where the correlation between the image data of the pixels A and B is high, and the correlation between the image data of the pixels C and D is high. It would be easily understood by the skilled person that the decompression of the compressed data compressed by the (2×2) pixel compression can be decompressed similarly for other cases.

First, a bit left shift is performed for the R representative value #1, the G representative value #1, and the B representative value #1. The number of bits for the bit left shift processing is determined in accordance with the relation of the differences $|R_A-R_B|$, $|G_A-G_B|$, and $|B_A-B_B|$ of the grayscale values with the threshold value β described in the β comparison result data. When the difference $|R_A-R_B|$ of the grayscale values of the R sub-pixels of the pixels A and B is larger than the threshold value β, a bit left shift of three bits is performed for the R representative value #1; otherwise, a bit left shift of two bits is performed. Similarly, when the difference $|G_A-G_B|$ of the grayscale values of the G sub-pixels of the pixels A and B is larger than the threshold value β, a bit left shift of three bits is performed for the G representative value #1; otherwise, a bit left shift of two bits is performed. Further, when the difference $|B_A-B_B|$ of the grayscale values of the B sub-pixels of the pixels A and B is larger than the threshold value β, a bit left shift of three bits is performed for the B representative value #1; otherwise, a bit left shift of two bits is performed. In the example of FIG. 21B, a bit left shift of three bits is performed for the R representative value #1, a bit left shift of two bits is performed for the G representative value #1, and a bit left shift of three bits is performed for the B representative value #1.

Similar bit left shifts are performed also for the R representative value #2, the G representative value #2, and the B representative value #2. It should be noted, however, that the number of bits of the bit left shift processing of the G representative value #2 is selected from one bit or two bits. When the difference $|G_C-G_D|$ of the grayscale values of the G sub-pixels of the pixels C and D is larger than the threshold value β, a bit left shift of two bits is performed for the G representative value #2; otherwise, a bit left shift of one bit is performed. In the example of FIG. 21B, a bit left shift of two bits is performed for the R representative value #2, a bit left shift of two bits is performed for the G representative value #2, and a bit left shift of three bits is performed for the B representative value #2.

Further, the grayscale values of R, G, and B sub-pixels of the pixels A and B and the grayscale values of R, G, and B sub-pixels of the pixels C and D are reproduced from the R representative value #1, the G representative value #1, the B representative value #1, the R representative value #12, the G representative value #2, and the B representative value #2, after subtracting the error data α from each of the R representative value #1, the G representative value #1, the B representative value #1, the R representative value #12, the G representative value #2, and the B representative value #2.

In the reproduction of the grayscale values, the β comparison result data and the large-small recognition data are used. When the fact that the difference $|R_A-R_B|$ of the grayscale values of the R sub-pixels of the pixels A and B is larger than the threshold value β is described in the β comparison result data, a value obtained by adding a fixed value of "5" to the R representative value #1 is reproduced as the grayscale value of the R sub-pixel which is described in the large-small recognition data as having a larger grayscale value out of the R sub-pixels of the pixels A and B, and a value obtained by subtracting a fixed value of "5" from the R representative value #1 is reproduced as the grayscale value of the R sub-pixel which is described in the large-small recognition data as having a smaller grayscale value. When the difference $|R_A-R_B|$ of the grayscale values of the R sub-pixels of the pixels A and B is smaller than the threshold value β, the grayscale values of the R sub-pixels of the pixels A and B are reproduced as being identical to the R representative value #1. Similarly, the grayscale values of the G sub-pixels and the B sub-pixels of the pixels A and B, and the grayscale values of the R sub-pixels, the G sub-pixels, and the B sub-pixels of the pixels C and D are also reproduced by the same procedure.

In the example of FIG. 21B, the grayscale value of the R sub-pixel of the pixel A is reproduced as the value obtained by subtracting a value of "5" from the R representative value #1, and the grayscale value of the R sub-pixel of the pixel B is reproduced as the value obtained by adding a value of "5" from the R representative value #1. Further, the grayscale values of the G sub-pixels of the pixels A and B are reproduced as being identical to the G representative value #1. Further, the grayscale value of the B sub-pixel of the pixel A is reproduced as the value obtained by subtracting a value of "5" from the B representative value #1, and the grayscale value of the B sub-pixel of the pixel B is reproduced as the value obtained by adding a value of "5" from the B representative value #1. On the other hand, the grayscale values of the R sub-pixels of the pixels C and D are reproduced as being identical to the B representative value #2. Further, the grayscale value of the G sub-pixel of the pixel C is reproduced as the value obtained by subtracting a value of "5" from the G representative value #2, and the grayscale value of the G sub-pixel of the pixel D is reproduced as the value obtained by adding a value of "5" from the G representative value #2. Further, the grayscale value of the B sub-pixel of the pixel C is reproduced as the value obtained by adding a value of "5" from the G representative value #2, and the grayscale value of the B sub-pixel of the pixel D is reproduced as the value obtained by subtracting a value of "5" from the G representative value #2.

The reproduction of the grayscale values of the R sub-pixels, the G sub-pixels, and the B sup-pixels of the pixels A to D is completed by the above-described procedure. It would be understood from comparison of the image data of the pixels A to D in the right column of FIG. 21B with the image data of the pixels A to D in the left column of FIG. 21A that the original image data of the pixels A to D are approximately reproduced by the above-described decompression method.

As a modified example of the compression and decompression processing of FIGS. 21A and 21B, the number of bits allocated to the representative value may be increased with respect to a specific combination of pixels, since two bits are given to the selection data, while there are three types of the combination of the two pixels in which the correlation of the image data is high. For example, let us consider a case when the selection data are defined as follows (x is an arbitrary symbol of "0" and "1"):

Case when the correlation between pixels A and B is high, and the correlation between pixels C and D is high: 0x Case when the correlation between pixels A and C is high, and the correlation between pixels B and D is high: 10

Case when the correlation between pixels A and D is high, and the correction between pixels B and C is high: 11

In this case, the number of bits allocated to the select data may be decreased to one when the correlation between the image data of the pixels A and B is high and the correlation between the image data of the pixels C and D is high, while the number of bits allocated to any one of the R representative value #1, the G representative value #1, the B representative value #1, the R representative value #2, and the B representative value #2 is increased by one bit. In order to improve symmetry of the data of the combination of the pixels A and B and the combination of the pixels C and D, the number of bits allocated to the G representative value #1 is preferably increased by one bit.

FIG. 22B is a diagram showing the format of compressed data generated by the (2×2) pixel compression in a case where the number of bits allocated to the G representative value #1 is increased by one bit when the correlation between the image data of the pixels A and B is high and the correlation between the image data of the pixels C and D is high. In the format of FIG. 22B, one bit is allocated to the selection data, and six bits or seven bits are given to the G representative value #1 in accordance with the relation with the difference $|G_A-G_B|$ of the grayscale values and the threshold value β. By increasing the number of bits given to the G representative value #1, the amount of information is increased and this effectively reduces the compression distortion. In this case, the bit left shift processing of one bit or two bits is performed for the G representative value #1 in the decompression processing. The number of bits for the bit left shift processing is determined in accordance with the relation with the difference $|G_A-G_B|$ of the grayscale values and the threshold value $\beta$.

3-5. (4×1) Pixel Compression

Figure 23A:
FIG. 23A is a conceptual illustration for explaining (4×1) pixel compression.
Figure 26:
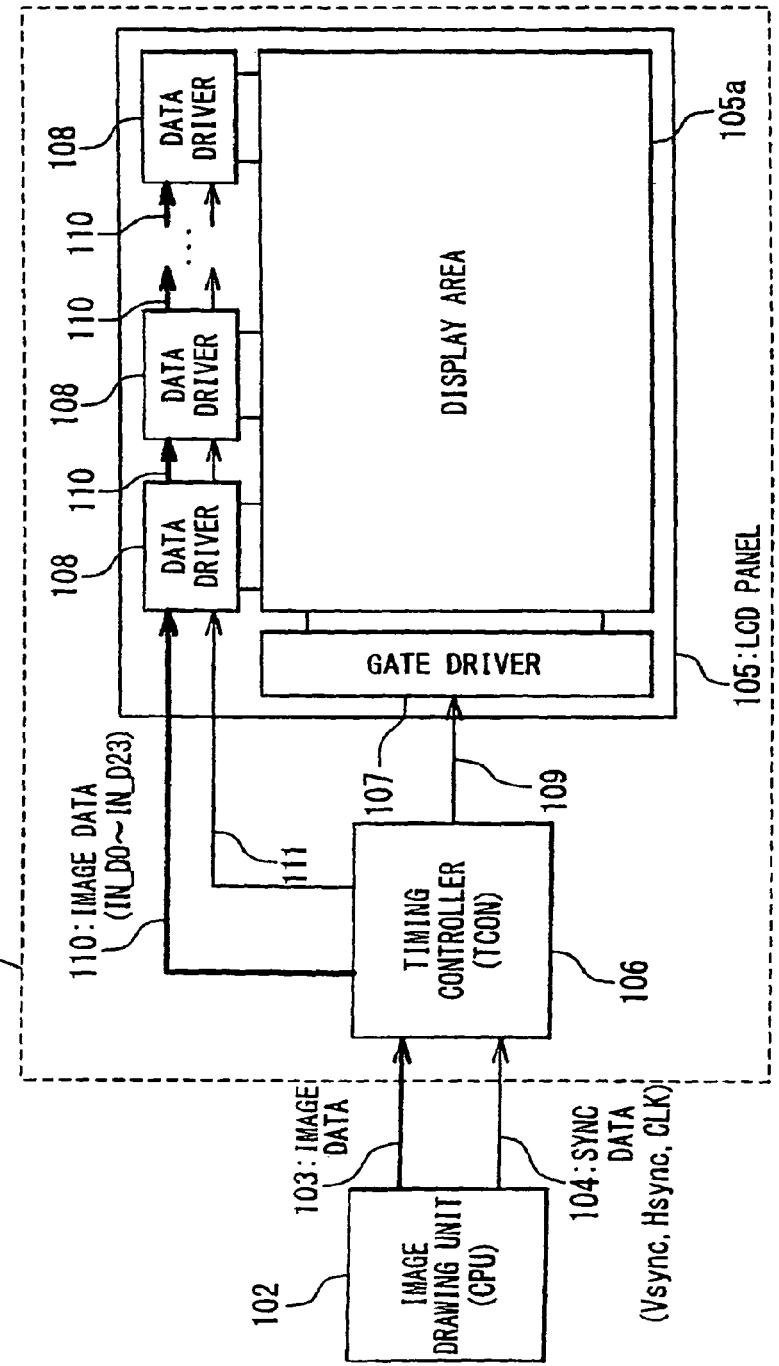
FIG. 26 is a block diagram showing the configuration of a conventional liquid display device.

FIG. 23A is a conceptual illustration showing the (4×1) pixel compression, and FIG. 24 is a conceptual illustration showing the format of the (4×1) compression data. As described above, the (4×1) pixel compression is used in a case where a high correlation exists between the image data of the four pixels of the target block. As shown in FIG. 24, in this embodiment, the (4×1) compressed data are 48-bit data composed of compression type recognition bits and the following seven data: Ymin, Ydist0 to Ydist2, address data, Cb' and Cr'.

The compression type recognition bits indicate the compression method used for the compression, and in the (4×1) compressed data, four bits are allocated to the compression type recognition bits. In this embodiment, the value of the compression type recognition bits of the (4×1) compressed data is "1110".

The data Ymin, Ydist0 to Ydist2, the address data, the data Cb' and Cr' are obtained by converting RGB image data of the four pixels of the target block into YUV data, and performing compression processing on the YUV data. The data Ymin and Ydist to Ydist2 are obtained from the brightness data of the YUV data of four pixels of the target block, and the data Cb' and Cr' are obtained from the color difference data. The data Ymin, Ydist0 to Ydist2, Cb' and Cr' are the representative values of the image data of the four pixels of the target block. In this embodiment, 10 bits are allocated to the data Ymin, four bits are allocated to each of the data Ydist0 to Ydist2, two bits are allocated to the address data, and 10 bits are allocated to each of the data Cb' and the Cr'. A detailed description of the (4×1) pixel compression is given below referring to FIG. 23A.

First, the brightness data Y and the color difference data Cr and Cb are calculated by the following matrix calculation with respect to each of the pixels A to D:

$$\begin{bmatrix} Y_k \\ Cr_k \\ Cb_k \end{bmatrix} = \begin{bmatrix} 1 & 2 & 1 \\ 0 & -1 & 1 \\ 1 & -1 & 0 \end{bmatrix} \begin{bmatrix} R_k \\ G_k \\ B_k \end{bmatrix},$$

where $Y_k$ is the brightness data of the pixel k, and $Cr_k$ and $Cb_k$ are the color difference data of the pixel k. Further, $R_k, G_k, B_k$ are the grayscale values of the R sub-pixel, the G sub-pixel, and the B sub-pixel of the pixel k, respectively, as described above.

Further, the data Ymin, the Ydist0 to Ydist2, the address data, the Cb' and Cr' are generated from the brightness data $Y_k$, the color difference data $Cr_k$ and $Cb_k$ of the pixels A to D.

Ymin is defined as the minimum value of the brightness data $Y_A$ to $Y_D$ (minimum brightness data). Further, Ydist0 to Ydist2 are generated by performing truncating two bits of the difference between the other brightness data and the minimum brightness data Ymin. The address data are generated as data indicating which is minimum among the brightness data of the pixels A to D. In the example of FIG. 23A, Ymin and the Ydist0 to Ydist2 are calculated by the following formula:

$Y\text{min}=Y_D=4,$ $Y\text{dist0}=(Y_A-Y\text{min})>>2=(48-4)>>2=11,$ $Y\text{dist1}=(Y_B-Y\text{min})>>2=(28-4)>>2=6,$ and $Y\text{dist2}=(Y_C-Y\text{min})>>2=(16-4)>>2=3,$ where ">>2" is an operator indicative of truncation of two bits. The fact that the brightness data $Y_D$ are minimum is described in the address data.

Further, Cr' is generated by truncation of one bit from the sum of the $Cr_A$ to $Cr_D$. Similarly, Cb' is generated by truncation of one bit from the sum of $Cb_A$ to $Cb_D$. In the example of FIG. 23A, Cr' and Cb' are calculated by the following formula:

$$Cr' = (Cr_A + Cr_B + Cr_C + Cr_D) >> 1,$$
$$= (2+1-1+1) >> 1$$
$$= 1,$$

$$Cb' = (Cb_A + Cb_B + Cb_C + Cb_D) >> 1, \text{ and}$$
$$= (-2-1+1-1) >> 1$$
$$= -1,$$

where ">>1" is an operator indicating truncation of one bit. The generation of the (4×1) compressed data is completed by the above-described procedure.

On the other hand, FIG. 23B is diagram showing the decompression method of the compressed image data compressed by the (4×1) pixel compression. In the decompression of the compressed image data compressed by the (4×1) pixel compression, the brightness data of each of the pixels A to D are first reproduced from Ymin and the Ydist0 to Ydist2. In the following, the reproduced brightness data of the pixels A to D are referred to as $Y_A'$ to $Y_D'$. More specifically, the value of the minimum brightness data Ymin is used as the brightness data of the pixel which is described as being the minimum in the address data. Further, the brightness data of the other pixels are reproduced by adding the minimum brightness data Ymin to the values obtained by bit left shifts of two bits on Ydist0 to Ydist2. In this embodiment, the brightness data $Y_A'$ to $Y_D'$ are reproduced by the following formula:

$Y_A'=Y\text{dist0}\times4+Y\text{min}=44+4=48,$ $Y_B'=Y\text{dist1}\times4+Y\text{min}=24+4=28,$ $Y_C'=Y\text{dist2}\times4+Y\text{min}=12+4=16,$ and $Y_D'=Y\text{min}=4.$ Further, the grayscale values of the R, G, and B sub-pixels of the pixels A to D are reproduced from the brightness data $Y_A'$ to $Y_D'$ and the color difference data Cr' and Cb' by the following matrix operation:

$$\begin{bmatrix} R_k \\ G_k \\ B_k \end{bmatrix} = \begin{bmatrix} 1 & -1 & 3 \\ 1 & -1 & -1 \\ 1 & 3 & -1 \end{bmatrix} \begin{bmatrix} Y_k' \\ Cr' \\ Cb' \end{bmatrix} >> 2,$$

where ">>2" is an operator showing the processing of rounding off two bits. As can be understood from the above formula, in the restoration of the grayscale values of R, G, and B sub-pixels of the pixels A to D, the color difference data Cr' and Cb' are used in common.

Thus, the restoration of the grayscale values of the R sub-pixels, the G sub-pixels, and B sub-pixels of the pixels A to D is completed. If the image data of the pixels A to D of the right column of FIG. 23B and the image data of the pixels A to D of the left column of FIG. 23A are compared, it will be understood that the original image data of the pixels A to D are approximately restored by the decompression method.

3-6. Calculation of Error Data α

In the following, a description is given of the calculation of the error data α used in the (1×4) pixel compression, the (2+1×2) pixel compression, and the (2×2) pixel compression.

The error data α used for the bit plane reduction processing performed for each pixel in the (1×4) pixel compression and the (2+1×2) pixel compression are calculated from the basic matrix shown in FIG. 25 and the coordinates of the respective pixels. The basic matrix is a matrix which describes the relation of the lower two bits x1 and x0 of the x coordinate of the pixel and lower two bits y1 and y0 of the y coordinate with a basic value Q of the error data α; the basic value Q is a value used as a seed of the calculation of the data α.

In detail, the basic value Q is extracted from the matrix elements of the basic matrix based on the lower two bits x1 and x0 of the x coordinate of the pixel of interest and the lower two bits y1 and y0 of the y coordinate. For example, when the bit-plane reduction processing is performed for the pixel A and the lower two bits of the x and y coordinates of the pixel A are "00", "15" is extracted as the basic value Q.

Further, the following calculation is performed for the basic value Q in accordance with the number of bits of the bit truncation processing which follows the bit-plane reduction processing to thereby calculate the error data α:

α=Q×2, (for a case when the number of bits of the bit truncation processing is five)

α=Q, (for a case when the number of bits of the bit truncation processing is four) and α=Q/2, (for a case when the number of bits of the bit round-off processing is three).

On the other hand, the error data α used for the calculation of the representative values of the image data of the two pixels having a high correlation in the (2+1×2) pixel compression, and the (2×2) pixel compression are calculated from the basic matrix shown in FIG. 25, and the second lowest bits x1 and y1 of the x and y coordinates of the two pixels of interest. In detail, one of the pixels of the target block is first selected as the pixel used for the extraction of the basic value Q in accordance with the combination of the two pixels of interest in the target block. The pixel used for the extraction of the basic value Q is referred to as Q extraction pixel, hereinafter. The relation of the combination of the two pixels of interest with the Q extraction pixel is as follows:

The Q extraction pixel is pixel A when the two pixels of interest are pixels A and B.
The Q extraction pixel is pixel A when the two pixels of interest are pixels A and C.
The Q extraction pixel is pixel A when the two pixels of interest are pixels A and D.
The Q extraction pixel is pixel B when the two pixels of interest are pixels B and C.
The Q extraction pixel is pixel B when the two pixels of interest are pixels B and D.
The Q extraction pixel is pixel B when the two pixels of interest are pixels C and D.

Further, the basic value Q associated with the Q extraction pixel is extracted from the basic matrix in accordance with the second lowest bits x1 and y1 of the x and y coordinates of the two pixels of interest. For example, when the two pixels of interest are pixels A and B, the Q extraction pixel is pixel A. In this case, out of the four basic values Q associated with pixel A in the basic matrix, the basic value Q finally used is selected as follows in accordance with x1 and y1:

$Q=15$, (for $x1=y1=$"0")

$Q=01$, (for $x1=$"1", $y1=$"0")

$Q=07$, (for $x1=$"0", $y1=$"1") and $Q=13 (x1=y1=$"1").

Further, the following calculation is performed for the basic value Q in accordance with the number of bits of the bit truncation processing which follows the calculation of the representative values to thereby calculate the error data α used for the calculation processing of the representative values of the image data of the two pixels having a high correlation:

α=Q/2, (for a case when the number of bits of the bit truncation processing is three)

α=Q/4, (for a case when the number of bits of the bit round-off processing is two) and α=Q/8 (for a case when the number of bits of the bit round-off processing is one).

For example, when the two pixels of interest are pixels A and B, x1=y1="1", and the number of bits of the bit truncation processing is three, the error data α are determined as follows:

$Q=13$, and $α=13/2=6$.

It should be noted that the calculation method of the error data α is not limited to the above-described method. For example, another matrix which is a Bayer matrix may be used as the basic matrix instead.

3-7. Compression Type Recognition Bits

One feature of the above-described compression method is the allocation of bits to the compression type recognition bits in each compressed image data. In this embodiment, the number of bits of the compressed image data is fixed to 48, whereas the number of the compression type recognition bit(s) is variable from one to four. In this embodiment, the compression type recognition bit(s) of the (1×4) pixel compression, the (2+1×2) pixel compression, the (2×2) pixel compression, and the (4×1) bit compression is defined as follows:

(1×4)pixel compression:"0"(one bit)

(2+1×2)pixel compression:"10"(two bits)

(2×2)pixel compression:"110"(three bits)

(4×1)bit compression:"1110"(four bits)

It should be noted that the number of bit(s) allocated to the compression type recognition bit(s) decreases as the decrease of the correlation between the image data of the pixels of the target block; the number of bit(s) allocated to the compression type recognition bits increases as the increase of the correlation between the image date of the pixels of the target block.

The fixation of the number of bits of the compression image date independently of the selection of the compression method is effective for the simplification of writing operations of the compressed image data onto the image memory 14 and of reading operations of the compressed image date from the image memory 14.

On the other hand, it is effective for reducing the compression distortion as a whole that the number of bit(s) allotted to the compression type recognition bits is decreased (that is, the number of bits allocated to the effective image data is increased) as the decrease of the correlation among the image data of the pixels of the target block. When the correlation among the image data of the pixels of the target block is high, the image data can be compressed with a reduced deterioration of the image data even if the number of bits allocated to the image data is reduced. On the other hand, when the correlation among the image data of the pixels of the target block is low, the number of bits allocated to the effective image data is increased to thereby reduce the compression distortion.

Although the various embodiments of the present invention have been described as above, it would apparent that the present invention is not limited to the above embodiments, but may be modified and changed without departing from the scope of the invention. For example, although the liquid crystal display device provided with the liquid crystal display panel is presented in the above described embodiments, it would be apparent to those skilled in the art that the present invention is applicable also to other display panels.

What is claimed is:

1. A display device, comprising:
a display panel;
first to n-th cascade-connected drivers, n being an integer of two or more; and
a controller transmitting compressed image data to said first driver, wherein the i-th driver out of said first to n-th drivers, wherein i is an integer, includes:
a drive circuitry driving said display panel;
a first bus adapted to data transfer to the (i+1)-th driver out of said first to n-th drivers;
a second bus adapted to data transfer to said drive circuitry; and
a decompression section receiving said compressed image data from the (i−1)-th driver out of said first to n-th drivers or said controller,
wherein, when said received compressed image data are not associated with said i-th driver, said decompression section of said i-th driver transfers said compressed image data to said (i+1)-th driver by using said first bus,
wherein, when said received decompressed image data are associated with said i-th driver, said decompression section of said i-th driver decompresses said compressed image data to generate decompressed image data and feeds said decompressed image data to said drive circuitry by using said second bus,
wherein said drive circuitry drives said display panel in response to said decompressed image data
wherein said i-th driver out of said first to (n−1)-th drivers is configured to receive a start pulse signal from the (i−1)-th driver out of said first to (n−1)-th drivers or said controller and to feed a start pulse signal to the (i+1)-th driver out of said first to n-th drivers, and
wherein said i-th driver out of said first to (n−1)-th drivers is responsive to said received start pulse signal for selecting an operation from a first operation in which said decompression section transfers said compressed image data to said (i+1)-th driver by using said first bus and a second operation in which said decompression section decompresses said compressed image data to generate decompressed image data and feeds said decompressed image data to said drive circuitry by using said second bus.

2. The display device according to claim 1, wherein said first bus, said second bus and said decompression section are configured so that a data transferable rate per unit time from said decompression section to said drive circuitry is higher than that from said decompression section to said (i+1)-th driver.

3. The display device according to claim 2, wherein a number of signal lines of said second bus is larger than that of said first bus.

4. The display device according to claim 3, wherein the number of signal lines of said second bus is twice of that of said first bus.

5. The display device according to claim 3, wherein said decompression section of said i-th driver fixes the signal lines of said first bus to a predetermined voltage level, when received decompressed image data are associated with said i-th driver.

6. The display device according to claim 2, wherein said first bus of said i-th driver is adapted to data transfer to said drive circuitry in addition to the data transfer to said (i+1)-th driver, and
wherein both of said first bus and said second bus are used for the transfer of said decompressed image data from said decompression section to said drive circuitry in said i-th driver.

7. The display device according to claim 6, wherein said compressed image data are $\alpha$-bit data,
wherein said decompressed image data are $\beta$-bit data,
wherein a number of signal lines of said first bus is a, and
wherein a number of signal lines of said second bus is $(\beta-\alpha)$, wherein $\alpha$ and $\beta$ are integers, and wherein $\beta$ is greater than $\alpha$.

8. The display device according to claim 6, wherein the i-th driver out of said first to (n−1)-th driver further includes a selector having an input connected to said first bus and an output connected to an interconnection connected between said i-th driver and said (i+1)-th driver, and
wherein said selector fixes said output thereof to a predetermined voltage level when said compressed image data are associated with said i-th driver.

9. The display device according to claim 1, wherein said controller includes a compression section which receives image data of m pixels arrayed in one row and m columns of a target block and compresses said image data to generate compressed image data associated with said target block, m being an integer of 4 or more,
wherein said compression section is adapted to select one of a plurality of compression methods in response to a correlation among the image data of said m pixels and to generate said compressed image data by using said selected compression method, and
wherein said plurality of compression methods include:
a first compression method in which a first representative value corresponding to the image data of said m pixels and said first representative value is incorporated into said compressed image data;
a second compression method in which a second representative value corresponding to image data of n pixels out of said m pixels ($2 \le n < m$) and said second representative value is incorporated into said compressed image data; and
a third compression method in which the image data of said m pixels are independently subjected to bit-plane reduction to generate first bit-plane reduced data, and said first bit-plane reduced data are incorporated into said compressed image data.

10. The display device according to claim 9, wherein a number of bits of said compressed image data is constant regardless of a selection of said plurality of compression methods,
wherein said compressed image data includes at least one compression type recognition bit indicative of said selected compression method,
wherein a number of bit(s) of said at least one compression type recognition bit in said compressed image data generated by said first compression method is equal to or more than that of said at least one compression type recognition bit in said compressed image data generated by said second compression method, and
wherein a number of bit(s) of said at least one compression type recognition bit in said compressed image data generated by said second compression method is equal to or more than that of said at least one compression type recognition bit in said compressed image data generated by said third compression method.

11. The display device according to claim 9, wherein said plurality of compression methods further include a lossless compression method in which said compression image data are generated by lossless compression, and wherein said compression section generates said compression image data by using said lossless compression method when the image data of said m pixels of said target block are in a predetermined specific pattern.

12. The display device according to claim 9, wherein m is four, and wherein said second compression method is defined so that said second representative value is calculated to correspond to image data of two of the four pixels in said target block, a third representative value is calculated to correspond to image data of other two of the four pixels in said target block, and said second and third representative values are incorporated into said compression image data.

13. The display device according to claim 12, wherein said plurality of compression methods further include:

a fourth compression method in which a fourth representative value corresponding to image data of two pixels of the four pixels in said target block and image data of the other two pixels of the four pixels in said target block are independently subjected to bit-plane reduction to generate second bit-plane reduced data, and said fourth representative value and said second bit-plane reduced data are incorporated into said compressed image data.

* * * * *